(12) United States Patent
Zhang et al.

(10) Patent No.: US 12,482,030 B2
(45) Date of Patent: Nov. 25, 2025

(54) GENERATING A SUGGESTED SHOPPING LIST BY POPULATING A TEMPLATE SHOPPING LIST OF ITEM CATEGORIES WITH ITEM TYPES AND QUANTITIES BASED ON A SET OF COLLECTION RULES

(71) Applicant: Maplebear Inc., San Francisco, CA (US)

(72) Inventors: Xuan Zhang, Palo Alto, CA (US); Vinesh Reddy Gudla, South San Francisco, CA (US); Tejaswi Tenneti, Fremont, CA (US); Haixun Wang, Palo Alto, CA (US)

(73) Assignee: Maplebear Inc., San Francisco, CA (US)

( * ) Notice: Subject to any disclaimer, the term of this patent is extended or adjusted under 35 U.S.C. 154(b) by 315 days.

(21) Appl. No.: 18/113,870

(22) Filed: Feb. 24, 2023

(65) Prior Publication Data

US 2024/0289867 A1 Aug. 29, 2024

(51) Int. Cl.
G06Q 30/0601 (2023.01)
(52) U.S. Cl.
CPC ..... G06Q 30/0633 (2013.01); G06Q 30/0619 (2013.01); G06Q 30/0631 (2013.01)
(58) Field of Classification Search
None
See application file for complete search history.

(56) References Cited

U.S. PATENT DOCUMENTS

2019/0392506 A1* 12/2019 Bogolea ............ G06Q 30/0633
2024/0070745 A1*  2/2024 Karikurve ......... G06Q 30/0633

OTHER PUBLICATIONS

L. Ma, J. H. D. Cho, S. Kumar and K. Achan, "Seasonality-Adjusted Conceptual-Relevancy-Aware Recommender System in Online Groceries," 2019 IEEE International Conference on Big Data (Big Data), Los Angeles, CA, USA, 2019, pp. 4435-4443, doi: 10.1109/BigData47090.2019.9005954. (Year: 2019).*

* cited by examiner

Primary Examiner — Michelle T Kringen
(74) Attorney, Agent, or Firm — Fenwick & West LLP

(57) ABSTRACT

An online system generates a template shopping list for a user by accessing a machine learning model trained based on historical order information associated with the user, applying the model to predict likelihoods of conversion for item categories by the user, and populating the template shopping list with one or more item categories based on the predicted likelihoods. The system ranks one or more item types associated with each item category in the template shopping list and determines a set of collection rules associated with one or more item categories/types based on the historical order information. The system generates a suggested shopping list by populating each item category in the template shopping list with one or more item types and a quantity of each item type based on the ranking and rules and sends the suggested shopping list and rules for display to a client device associated with the user.

18 Claims, 7 Drawing Sheets

| Item Category 405 | Quantity/ Budget 407A | Collection Rule 410A | Item Type 415 Rank 403 | | | | Quantity/ Budget 407B | | Collection Rule 410B | | |
|---|---|---|---|---|---|---|---|---|---|---|---|
| | | | | Suggested Shopping List 402 | | | | | | | |
| Fruit | 3 Item Types | Fresh & Organic | 1 | Apple | Edit | X | 6 | Edit | Fuji | Edit | X |
| | | | 2 | Banana | Edit | X | 5 | Edit | Green | Edit | X |
| | | | 3 | Orange | Edit | X | 4 | Edit | Navel | Edit | X |
| | | | 4 | Peach | Edit | X | 4 | Edit | Yellow | Edit | X |
| | | | ⋮ | | | | ⋮ | | ⋮ | | |
| Vegetable | 6 Item Types | Fresh & Organic | 1 | Carrot | Edit | X | 8 oz. | Edit | Bag, Peeled | Edit | X |
| | | | 2 | Potato | Edit | X | 4 | Edit | Baking | Edit | X |
| | | | ⋮ | | | | ⋮ | | ⋮ | | |
| ⋮ | ⋮ | ⋮ | ⋮ | | | | ⋮ | | ⋮ | | |

| Rank 403 | Item Category 405 | | | Quantity/Budget 407 | | | Collection Rule 410 | | |
|---|---|---|---|---|---|---|---|---|---|
| 1 | Fruit | Edit | X | 3 Item Types | Edit | | Fresh & Organic | Edit | X |
| 2 | Vegetable | Edit | X | 6 Item Types | Edit | | Fresh & Organic | Edit | X |
| 3 | Meat | Edit | X | $30.00 Budget | Edit | | No Antibiotics | Edit | X |
| 4 | Dairy | Edit | X | 4 Item Types | Edit | | None | Edit | X |
| ... | ... | ... | ... | ... | ... | | ... | ... | ... |

Template Shopping List 400

FIG. 4A

Suggested Shopping List 402

| Item Category 405 | Quantity/Budget 407A | Collection Rule 410A | Rank 403 | Item Type 415 | | | Quantity/Budget 407B | | Collection Rule 410B | | |
|---|---|---|---|---|---|---|---|---|---|---|---|
| Fruit | 3 Item Types | Fresh & Organic | 1 | Apple | Edit | X | 6 | Edit | Fuji | Edit | X |
| | | | 2 | Banana | Edit | X | 5 | Edit | Green | Edit | X |
| | | | 3 | Orange | Edit | X | 4 | Edit | Navel | Edit | X |
| | | | 4 | Peach | Edit | X | 4 | Edit | Yellow | Edit | X |
| | | | ... | ... | ... | ... | ... | ... | ... | ... | ... |
| Vegetable | 6 Item Types | Fresh & Organic | 1 | Carrot | Edit | X | 8 oz. | Edit | Bag, Peeled | Edit | X |
| | | | 2 | Potato | Edit | X | 4 | Edit | Baking | Edit | X |
| ... | ... | | ... | ... | ... | ... | ... | ... | ... | ... | ... |

FIG. 4B

| Flexible Shopping List 404 | Collected | Not Available |
|---|---|---|
| Fruit (3 Item Types) | | |
| Apple (6 Fuji, Fresh & Organic) | ✓ | |
| Banana (5 Green, Fresh & Organic) | | ✓ |
| Orange (4 Navel, Fresh & Organic) | | |

| | Collected | Not Available |
|---|---|---|
| Vegetable (6 Item Types) | | |
| Carrot (8oz Bag, Peeled, Fresh & Organic) | | |
| Potato (4 Baking, Fresh & Organic) | | |
| Spinach (1 Bunch, Fresh & Organic) | | |
| ... | ... | ... |

FIG. 4C

| Flexible Shopping List 404 | | | | | | | | |
|---|---|---|---|---|---|---|---|---|
| Fruit (3 Item Types) | Collected | Not Available | | | Vegetable (6 Item Types) | Collected | Not Available | |
| Apple (6 Fuji, Fresh & Organic) | ✓ | | | | Carrot (8oz Bag, Peeled, Fresh & Organic) | | | |
| Banana (5 Green, Fresh & Organic) | | ✓ | | | Potato (4 Baking, Fresh & Organic) | | | |
| Orange (4 Navel, Fresh & Organic) | | | | | Spinach (1 Bunch, Fresh & Organic) | ... | ... | |
| Peach (4 Yellow, Fresh & Organic) | | | | | ... | | | |

FIG. 4D

GENERATING A SUGGESTED SHOPPING LIST BY POPULATING A TEMPLATE SHOPPING LIST OF ITEM CATEGORIES WITH ITEM TYPES AND QUANTITIES BASED ON A SET OF COLLECTION RULES

BACKGROUND

Online systems, such as online concierge systems and online retailers, provide customers with the convenience of placing orders that are subsequently fulfilled on their behalf and delivered to them. Online systems may allow customers to create shopping lists specifying items and quantities of items included in their orders. When creating shopping lists, customers also may provide instructions for collecting items in the shopping lists. For example, a customer may provide instructions to collect only fresh and organic fruits and vegetables included in a grocery shopping list.

However, if the convenience provided by online systems is negated because customers find that using them is more time-consuming than doing their own shopping and/or if they are dissatisfied with the items that are collected, the customers may decide to stop placing orders with the online systems. For example, if a customer finds it too inconvenient and time-consuming to create a shopping list for a large order and to provide several very specific instructions for collecting items in the shopping list, they may decide to do their own shopping instead. As an additional example, a customer may prefer to do their own shopping if instructions for collecting items in previous orders were not followed or if they found it too inconvenient and time-consuming to provide additional instructions for replacing items that were not available. As yet another example, if a customer who places an order with an online system receives items that are damaged or already spoiled, they may refrain from placing additional orders with the online system if they have to spend time collecting replacements for the items from a retailer location after also spending time requesting a refund for the damaged/spoiled items.

Further, designing and implementing a computer system to achieve these goals is challenging, especially when attempting to optimize consumption of computing resources such as processing power and network bandwidth.

SUMMARY

In accordance with one or more aspects of the disclosure, an online system generates a suggested shopping list by populating a template shopping list of item categories with item types and quantities based on a set of collection rules. More specifically, the online system generates a template shopping list for a user of the online system, in which the template shopping list includes one or more item categories. To generate the template shopping list, the online system accesses a machine learning model trained to predict a likelihood of conversion for an item category by the user, in which the machine learning model is trained based at least in part on historical order information associated with the user. The online system then applies the model to one or more attributes of the user and each item category of a plurality of item categories to predict a likelihood of conversion for each item category by the user and populates the template shopping list with the one or more item categories based at least in part on the predicted likelihood of conversion for each item category by the user. For each item category of the one or more item categories, the online system ranks one or more item types associated with a corresponding item category based at least in part on the historical order information associated with the user. Based at least in part on the historical order information associated with the user, the online system then determines a set of collection rules associated with an item category and/or an item type. The online system then generates a suggested shopping list by populating each item category of the one or more item categories with a set of item types and information describing a quantity of each item type based at least in part on the ranking and the set of collection rules. The suggested shopping list and the set of collection rules are then sent for display to a client device associated with the user. A request subsequently may be received from the client device to modify one or more item categories, item types, and/or collection rules. A request also subsequently may be received from the client device to accept the template shopping list, the suggested shopping list, and/or the set of collection rules. The template shopping list and/or the set of collection rules may be stored in association with user-identifying information associated with the user.

Responsive to receiving a request from the client device to accept the suggested shopping list and the set of collection rules, the suggested shopping list and the set of collection rules may be sent to a picker client device associated with a picker servicing a new order for the user. Upon receiving a notification from the picker client device that an item type included in the shopping list does not satisfy one or more collection rules, the suggested shopping list may be updated to include an additional item type and information describing a quantity of the additional item type based at least in part on the ranking and the set of collection rules. The updated suggested shopping list may then be sent for display to the picker client device.

BRIEF DESCRIPTION OF THE DRAWINGS

FIG. 4A illustrates an example of a template shopping list, in accordance with one or more embodiments.

FIG. 4B illustrates an example of a suggested shopping list, in accordance with one or more embodiments.

FIGS. 4C-4D illustrate examples of a flexible shopping list, in accordance with one or more embodiments.

DETAILED DESCRIPTION

Figure 1:
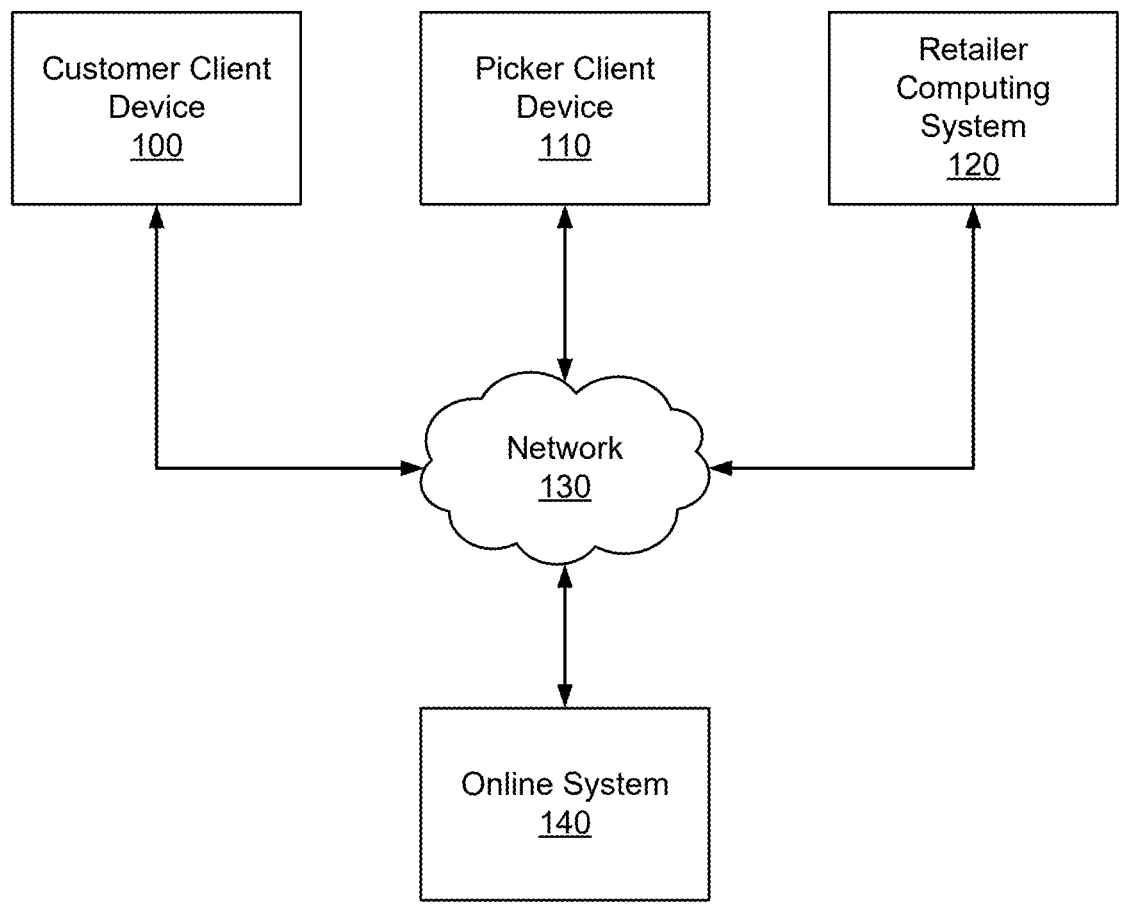
FIG. 1 illustrates an example system environment for an online system, in accordance with one or more embodiments.

FIG. 1 illustrates an example system environment for an online system 140, such as an online concierge system, in accordance with one or more embodiments. The system environment illustrated in FIG. 1 includes a customer client device 100, a picker client device 110, a retailer computing system 120, a network 130, and an online system 140. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

As used herein, customers, pickers, and retailers may be generically referred to as "users" of the online system 140. Additionally, while one customer client device 100, picker client device 110, and retailer computing system 120 are illustrated in FIG. 1, any number of customers, pickers, and retailers may interact with the online system 140. As such, there may be more than one customer client device 100, picker client device 110, or retailer computing system 120.

The customer client device 100 is a client device through which a customer may interact with the picker client device 110, the retailer computing system 120, or the online system 140. The customer client device 100 can be a personal or mobile computing device, such as a smartphone, a tablet, a laptop computer, or a desktop computer. In some embodiments, the customer client device 100 executes a client application that uses an application programming interface (API) to communicate with the online system 140.

A customer uses the customer client device 100 to place an order with the online system 140. An order specifies a set of items to be delivered to the customer. An "item," as used herein, refers to a good or product that may be provided to the customer through the online system 140. The order may include item identifiers (e.g., a stock keeping unit or a price look-up code) for items to be delivered to the customer and may include quantities of the items to be delivered. Additionally, an order may further include a delivery location to which the ordered items are to be delivered and a timeframe during which the items should be delivered. In some embodiments, the order also specifies one or more retailers from which the ordered items should be collected.

The customer client device 100 presents an ordering interface to the customer. The ordering interface is a user interface that the customer can use to place an order with the online system 140. The ordering interface may be part of a client application operating on the customer client device 100. The ordering interface allows the customer to search for items that are available through the online system 140 and the customer can select which items to add to a "shopping list." A "shopping list," as used herein, is a tentative set of items that the user has selected for an order but that has not yet been finalized for an order. The ordering interface allows a customer to update the shopping list, e.g., by changing the quantity of items, adding or removing items, or adding instructions for items that specify how the items should be collected.

The customer client device 100 may receive additional content from the online system 140 to present to a customer. For example, the customer client device 100 may receive coupons, recipes, or item suggestions. The customer client device 100 may present the received additional content to the customer as the customer uses the customer client device 100 to place an order (e.g., as part of the ordering interface).

Additionally, the customer client device 100 includes a communication interface that allows the customer to communicate with a picker that is servicing the customer's order. This communication interface allows the user to input a text-based message to transmit to the picker client device 110 via the network 130. The picker client device 110 receives the message from the customer client device 100 and presents the message to the picker. The picker client device 110 also includes a communication interface that allows the picker to communicate with the customer. The picker client device 110 transmits a message provided by the picker to the customer client device 100 via the network 130. In some embodiments, messages sent between the customer client device 100 and the picker client device 110 are transmitted through the online system 140. In addition to text messages, the communication interfaces of the customer client device 100 and the picker client device 110 may allow the customer and the picker to communicate through audio or video communications, such as a phone call, a voice-over-IP call, or a video call.

The picker client device 110 is a client device through which a picker may interact with the customer client device 100, the retailer computing system 120, or the online system 140. The picker client device 110 can be a personal or mobile computing device, such as a smartphone, a tablet, a laptop computer, or a desktop computer. In some embodiments, the picker client device 110 executes a client application that uses an application programming interface (API) to communicate with the online system 140.

The picker client device 110 receives orders from the online system 140 for the picker to service. A picker services an order by collecting the items listed in the order from a retailer location. The picker client device 110 presents the items that are included in the customer's order to the picker in a collection interface. The collection interface is a user interface that provides information to the picker on which items to collect for a customer's order and the quantities of the items. In some embodiments, the collection interface provides multiple orders from multiple customers for the picker to service at the same time from the same retailer location. The collection interface further presents instructions that the customer may have included related to the collection of items in the order. Additionally, the collection interface may present a location of each item in the retailer location, and may even specify a sequence in which the picker should collect the items for improved efficiency in collecting items. In some embodiments, the picker client device 110 transmits to the online system 140 or the customer client device 100 which items the picker has collected in real time as the picker collects the items.

The picker can use the picker client device 110 to keep track of the items that the picker has collected to ensure that the picker collects all of the items for an order. The picker client device 110 may include a barcode scanner that can determine an item identifier encoded in a barcode coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and determines the item identifier for the item based on the images. The picker client device 110 may determine the item identifier directly or by transmitting the images to the online system 140. Furthermore, the picker client device 110 determines a weight for items that are priced by weight. The picker client device 110 may prompt the picker to manually input the weight of an item or may communicate with a weighing system in the retailer location to receive the weight of an item.

When the picker has collected all of the items for an order, the picker client device 110 instructs a picker on where to deliver the items for a customer's order. For example, the picker client device 110 displays a delivery location from the order to the picker. The picker client device 110 also provides navigation instructions for the picker to travel from the retailer location to the delivery location. If a picker is servicing more than one order, the picker client device 110 identifies which items should be delivered to which delivery location. The picker client device 110 may provide navigation instructions from the retailer location to each of the delivery locations. The picker client device 110 may receive one or more delivery locations from the online system 140 and may provide the delivery locations to the picker so that the picker can deliver the corresponding one or more orders to those locations. The picker client device 110 may also provide navigation instructions for the picker from the retailer location from which the picker collected the items to the one or more delivery locations.

In some embodiments, the picker client device 110 tracks the location of the picker as the picker delivers orders to delivery locations. The picker client device 110 collects location data and transmits the location data to the online system 140. The online system 140 may transmit the location data to the customer client device 100 for display to the customer such that the customer can keep track of when their order will be delivered. Additionally, the online system 140 may generate updated navigation instructions for the picker based on the picker's location. For example, if the picker takes a wrong turn while traveling to a delivery location, the online system 140 determines the picker's updated location based on location data from the picker client device 110 and generates updated navigation instructions for the picker based on the updated location.

In one or more embodiments, the picker is a single person who collects items for an order from a retailer location and delivers the order to the delivery location for the order. Alternatively, more than one person may serve the role as a picker for an order. For example, multiple people may collect the items at the retailer location for a single order. Similarly, the person who delivers an order to its delivery location may be different from the person or people who collected the items from the retailer location. In these embodiments, each person may have a picker client device 110 that they can use to interact with the online system 140.

Additionally, while the description herein may primarily refer to pickers as humans, in some embodiments, some or all of the steps taken by the picker may be automated. For example, a semi- or fully-autonomous robot may collect items in a retailer location for an order and an autonomous vehicle may deliver an order to a customer from a retailer location.

The retailer computing system 120 is a computing system operated by a retailer that interacts with the online system 140. As used herein, a "retailer" is an entity that operates a "retailer location," which is a store, warehouse, or other building from which a picker can collect items. The retailer computing system 120 stores and provides item data to the online system 140 and may regularly update the online system 140 with updated item data. For example, the retailer computing system 120 may provide item data indicating which items are available at a retailer location and the quantities of those items. Additionally, the retailer computing system 120 may transmit updated item data to the online system 140 when an item is no longer available at the retailer location. Additionally, the retailer computing system 120 may provide the online system 140 with updated item prices, sales, or availabilities. Additionally, the retailer computing system 120 may receive payment information from the online system 140 for orders serviced by the online system 140. Alternatively, the retailer computing system 120 may provide payment to the online system 140 for some portion of the overall cost of a user's order (e.g., as a commission).

The customer client device 100, the picker client device 110, the retailer computing system 120, and the online system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all standard layers used to describe a physical or virtual network, such as the physical layer, the data link layer, the network layer, the transport layer, the session layer, the presentation layer, and the application layer. The network 130 may include physical media for communicating data from one computing device to another computing device, such as MPLS lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online system 140 may be an online concierge system by which customers can order items to be provided to them by a picker from a retailer. The online system 140 receives orders from a customer client device 100 through the network 130. The online system 140 selects a picker to service the customer's order and transmits the order to a picker client device 110 associated with the picker. The picker collects the ordered items from a retailer location and delivers the ordered items to the customer. The online system 140 may charge a customer for the order and provide portions of the payment from the customer to the picker and the retailer.

As an example, the online system 140 may allow a customer to order groceries from a grocery store retailer. The customer's order may specify which groceries they want delivered from the grocery store and the quantities of each of the groceries. The customer client device 100 transmits the customer's order to the online system 140 and the online system 140 selects a picker to travel to the grocery store retailer location to collect the groceries ordered by the customer. Once the picker has collected the groceries ordered by the customer, the picker delivers the groceries to a location transmitted to the picker client device 110 by the online system 140. The online system 140 is described in further detail below with regards to FIG. 2.

Figure 2:
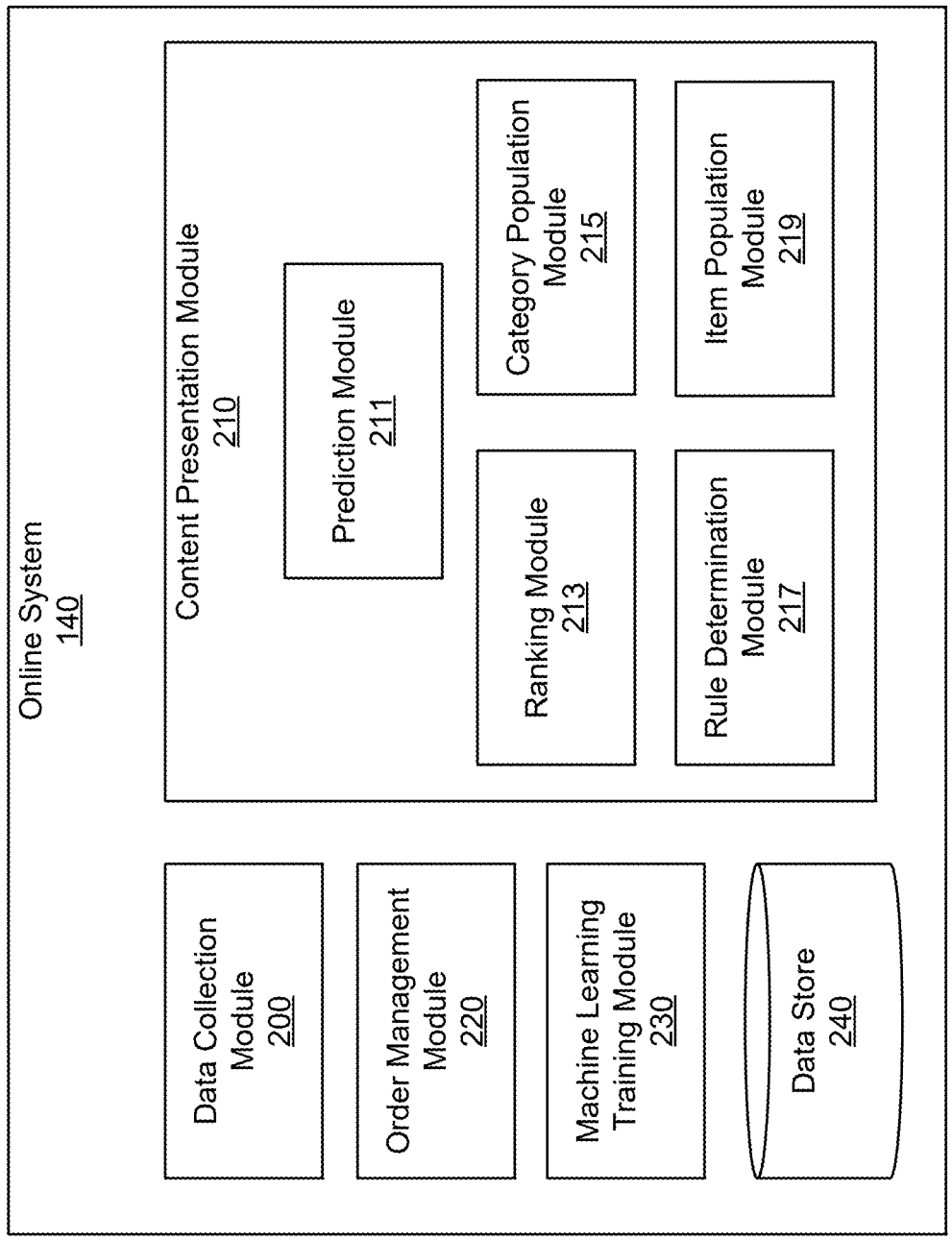
FIG. 2 illustrates an example system architecture for an online system, in accordance with one or more embodiments.

FIG. 2 illustrates an example system architecture for an online system 140, such as an online concierge system, in accordance with some embodiments. The system architecture illustrated in FIG. 2 includes a data collection module 200, a content presentation module 210, an order management module 220, a machine learning training module 230, and a data store 240. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online system 140 and stores the data in the data store 240. The data collection module 200 may only collect data describing a user if the user has previously explicitly consented to the online system 140 collecting data describing the user. Additionally, the data collection module 200 may encrypt all data, including sensitive or personal data, describing users.

The data collection module 200 collects customer data, which is information or data that describe characteristics of a customer. Customer data may include a customer's name, address, shopping preferences, favorite items, order information, or stored payment instruments. Customer data also may describe a tenure of a customer with the online system 140, a platform used by the customer to access the online system 140, a geographical region associated with the customer, an average amount the customer spends on each order, an average number of orders placed by the customer (e.g., per month), and/or a frequency with which the customer places orders. Customer data further may describe a set of dietary preferences associated with a customer (e.g., vegetarian, gluten-free, etc.), a discount affinity of the customer (e.g., for an item type or an item category), a price sensitivity of the customer (e.g., for an item type or an item category), an average number of each item type ordered by the customer, and/or a frequency with which the customer orders each item type. Additionally, customer data may describe a search history of a customer, a browsing history of the customer, retailers with which the customer interacted (e.g., names, types, geographical locations, etc.), item types with which the customer interacted (e.g., by searching, browsing, adding to a cart, etc.), and/or any other suitable types of information. The customer data also may include default settings established by the customer, such as a default retailer/retailer location, payment instrument, delivery location, or delivery timeframe. The data collection module 200 may collect the customer data from sensors on the customer client device 100 or based on the customer's interactions with the online system 140.

The data collection module 200 also collects item data, which is information or data that identifies and describes types of items or "item types" that are available at a retailer location. The item data may include item identifiers for item types that are available and may include quantities of item types associated with each item identifier. Additionally, item data may also include attributes of item types such as the names, sizes, dimensions, colors, weights, stock keeping units (SKUs), or serial numbers for the item types. In some embodiments, item data also may include prices, item categories, brands, sales, discounts, freshness, seasonality, qualities, ingredients, materials, manufacturing locations, or any other suitable attributes associated with item types. In embodiments in which item data includes item categories associated with item types, the item data further may include attributes of the item categories. In such embodiments, attributes of an item category may include attributes of item types associated with the item category. The item data may further include purchasing rules associated with each item type, if they exist. For example, age-restricted item types such as alcohol and tobacco are flagged accordingly in the item data. Item data may also include information that is useful for predicting the availability of item types in retailer locations. For example, for each item type-retailer combination (a particular item type at a particular retailer location), the item data may include a time that the item type was last found, a time that the item type was last not found (a picker looked for the item type but could not find it), the rate at which the item type is found, or the popularity of the item type. The data collection module 200 may collect item data from a retailer computing system 120, a picker client device 110, or a customer client device 100.

An item category is a set of item types that are similar. Item types in an item category may be considered to be equivalent to each other or that may be replacements for each other in an order. For example, different brands of sourdough bread may be different item types, but these item types may be in a "sourdough bread" item category. In some embodiments, item categories may be broader in that the same item category may include a wide variety of item types that are related to a common theme, found in the same department, etc. For example, ground turkey and top sirloin steak may be included in a "meat" item category. As an additional example, organic strawberries and organic apples may be included in a "produce" item category, an "organic produce" item category, a "fruit" item category, an "organic fruit" item category, etc. Examples of item categories include: grocery item categories (e.g., "vegetable," "fruit," "meat," "seafood," "dairy," "frozen," "bakery," "alcohol," etc.), "floral," "personal care," "cleaning," "office," "pet," "pharmaceutical," "gift," "book," "toy," "electronic," clothing item categories (e.g., "outerwear," "top," "bottom," etc.), "shoes," or any other suitable categories of items. The item categories may be human-generated and human-populated with item types. The item categories also may be generated automatically by the online system 140 (e.g., using a clustering algorithm).

The data collection module 200 also collects picker data, which is information or data that describes characteristics of pickers. For example, the picker data for a picker may include the picker's name, the picker's location, how often the picker has serviced orders for the online system 140, a customer rating for the picker, the retailers from which the picker has collected items, or the picker's previous shopping history. Additionally, the picker data may include preferences expressed by the picker, such as their preferred retailers for collecting items, how far they are willing to travel to deliver items to a customer, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online system 140.

Additionally, the data collection module 200 collects order data, which is information or data that describes characteristics of an order. For example, order data may include item data for items that are included in the order, a delivery location for the order, a customer associated with the order, a retailer location from which the customer wants the ordered items collected, or a timeframe within which the customer wants the order delivered. Order data may further include information describing how the order was serviced, such as which picker serviced the order, when the order was delivered, or a rating that the customer gave the delivery of the order.

The content presentation module 210 selects content for presentation to a customer. For example, the content presentation module 210 selects which items to present to a customer while the customer is placing an order. Components of the content presentation module 210 include a prediction module 211, a ranking module 213, a category population module 215, a rule determination module 217, and an item population module 219. The content presentation module 210 generates and transmits the ordering interface for the customer to order items. The content presentation module 210 populates the ordering interface with items that the customer may select for adding to their order. In some embodiments, the content presentation module 210 presents a catalog of all items that are available to the customer, which the customer can browse to select items to order. The content presentation module 210 also may identify items that the customer is most likely to order and present those items to the customer. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a customer. An item selection model is a machine learning model that is trained to score items for a customer based on item data for the items and customer data for the customer. For example, the item selection model may be trained to determine a likelihood that the customer will order the item. In some embodiments, the item selection model uses item embeddings describing items and customer embeddings describing customers to score items. These item embeddings and customer embeddings may be generated by separate machine learning models and may be stored in the data store 240.

In some embodiments, the content presentation module 210 scores items based on a search query received from the customer client device 100. A search query is text for a word or set of words that indicate items of interest to the customer. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a customer (e.g., by comparing a search query embedding to an item embedding).

In some embodiments, the content presentation module 210 scores items based on a predicted availability of an item. The content presentation module 210 may use an availability model to predict the availability of an item. An availability model is a machine learning model that is trained to predict the availability of an item at a retailer location. For example, the availability model may be trained to predict a likelihood that an item is available at a retailer location or may predict an estimated number of items that are available at a retailer location. The content presentation module 210 may weight the score for an item based on the predicted availability of the item. Alternatively, the content presentation module 210 may filter out items from presentation to a customer based on whether the predicted availability of the item exceeds a threshold.

The prediction module 211 may predict likelihoods of conversion for item categories by a customer. A likelihood of conversion for an item category by a customer indicates a likelihood that the customer will order one or more item types associated with the item category. The prediction module 211 may make the prediction based at least in part on historical order information associated with the customer. For example, based on information describing item types associated with an item category previously ordered by a customer (e.g., quantity ordered, frequency ordered, prices/discounts associated with the item types, retailer locations from which the item types were collected, etc.), the prediction module 211 may predict a likelihood of conversion for the item category by the customer. In some embodiments, a predicted likelihood of conversion for an item category by a customer may be specific to a retailer or a retailer location. In various embodiments, the prediction module 211 also may predict a likelihood of conversion for an item category by a customer based on additional types of information. Examples of such information include: customer data associated with the customer (e.g., dietary preferences, search history, browsing history, etc.), item data associated with item types with which the customer interacted, information associated with retailers with which the customer interacted, and/or any other suitable types of information. For example, the prediction module 211 also may predict a likelihood of conversion for an item category by a customer based on information describing prices, item categories, brands, sizes, sales, discounts, quantities, freshness, seasonality, etc. associated with item types searched, browsed, or added to a cart by the customer. In the above example, the prediction module 211 also may predict the likelihood of conversion for the item category by the customer based on a geographical region and dietary preferences associated with the customer, an average amount the customer spent on each order, and a name, a type, a geographical location, etc. associated with each retailer with which the customer interacted.

In embodiments in which less than a threshold amount of historical order information or other information associated with a customer is available, the prediction module 211 also or alternatively may predict likelihoods of conversion for item categories by the customer based on historical order information or other information associated with other customers. For example, suppose that customer data associated with a customer describes a tenure of the customer with the online system 140 that is less than a threshold number of months or indicates that the customer has placed fewer than a threshold number of orders with the online system 140. In this example, the prediction module 211 may predict a likelihood of conversion for an item category by the customer based on historical order information or other data (e.g., customer data) associated with other customers (e.g., all customers, customers in the same geographical region, customers with the same dietary preferences, customers with similar browsing histories, etc.).

In some embodiments, the prediction module 211 may predict a likelihood of conversion for an item category by a customer using one or more item category conversion models. An item category conversion model is a machine learning model that is trained to predict a likelihood of conversion for an item category by a customer based at least in part on historical order information associated with the customer. For example, an item category conversion model may be trained to predict a likelihood that a customer will order one or more item types associated with an item category. In various embodiments, an item category conversion model also may be trained based on additional types of information associated with a customer. Examples of such information include: customer data associated with the customer, item data associated with item types with which the customer interacted, information associated with retailers with which the customer interacted, etc., as described above. In some embodiments, an item category conversion model uses item category embeddings describing item categories and customer embeddings describing customers to predict likelihoods of conversion for item categories by customers. These item category embeddings and customer embeddings may be generated by separate machine learning models and may be stored in the data store 240. In some embodiments, an item category conversion model may be trained by the machine learning training module 230, as further described below.

In embodiments in which the prediction module 211 predicts a likelihood of conversion for an item category by a customer using one or more item category conversion models, the prediction module 211 may access the model(s) (e.g., from the data store 240) and apply the model(s) to one or more attributes of the customer, the item category, and/or a retailer to predict the likelihood of conversion for the item category by the customer. For example, the prediction module 211 may apply the item category conversion model(s) to attributes of a customer, such as their tenure with the online system 140, dietary preferences, etc. included among customer data associated with the customer and attributes of an item category, such as a price, a sale, etc. included among item data associated with item types associated with the item category. In this example, the prediction module 211 also may apply the item category conversion model(s) to attributes of a retailer associated with a retailer location from which the item types associated with the item category may be collected, such as a name, a geographical location, a type, etc. associated with the retailer. The prediction module 211 may then receive an output from the item category conversion model(s) corresponding to a predicted likelihood of conversion for the item category by the customer.

The prediction module 211 also may predict likelihoods of conversion for item types by a customer. A likelihood of conversion for an item type by a customer indicates a likelihood that the customer will order the item type. The prediction module 211 may make the prediction based at least in part on previous purchases the customer. For example, based on information describing an item type previously ordered by a customer (e.g., quantity ordered, frequency ordered, prices/discounts associated with the item type, retailer locations from which the item type was collected, etc.), the prediction module 211 may predict a likelihood of conversion for the item type by the customer. In some embodiments, a predicted likelihood of conversion for an item type by a customer may be specific to a retailer or a retailer location. In various embodiments, the prediction module 211 also may predict a likelihood of conversion for an item type by a customer based on additional types of information. Examples of such information include: customer data associated with the customer (e.g., dietary preferences, search history, browsing history, etc.), item data associated with item types with which the customer interacted, information associated with retailers with which the customer interacted, and/or any other suitable types of information. For example, the prediction module 211 also may predict a likelihood of conversion for an item type by a customer based on information describing prices, item categories, brands, sizes, sales, discounts, quantities, freshness, seasonality, etc. associated with item types searched, browsed, or added to a cart by the customer. In the above example, the prediction module 211 also may predict the likelihood of conversion for the item type by the customer based on a geographical region and dietary preferences associated with the customer, an average amount the customer spent on each order, and a name, a type, a geographical location, etc. associated with each retailer with which the customer interacted.

In embodiments in which less than a threshold amount of historical order information or other information associated with a customer is available, the prediction module 211 also or alternatively may predict likelihoods of conversion for item types by the customer based on historical order information or other information associated with other customers. For example, suppose that customer data associated with a customer describes a tenure of the customer with the online system 140 that is less than a threshold number of months or indicates that the customer has placed fewer than a threshold number of orders with the online system 140. In this example, the prediction module 211 may predict a likelihood of conversion for an item type by the customer based on historical order information or other data (e.g., customer data) associated with other customers (e.g., all customers, customers in the same geographical region, customers with the same dietary preferences, customers with similar browsing histories, etc.).

In some embodiments, the prediction module 211 may predict a likelihood of conversion for an item type by a customer using one or more item type conversion models. An item type conversion model is a machine learning model that is trained to predict a likelihood of conversion for an item type by a customer based at least in part on historical order information associated with the customer. For example, an item type conversion model may be trained to predict a likelihood that a customer will order an item type. In various embodiments, an item type conversion model also may be trained based on additional types of information associated with a customer. Examples of such information include: customer data associated with the customer, item data associated with item types with which the customer interacted, information associated with retailers with which the customer interacted, etc., as described above. In some embodiments, an item type conversion model uses item type embeddings describing item types and customer embeddings describing customers to predict likelihoods of conversion for item types by customers. These item type embeddings and customer embeddings may be generated by separate machine learning models and may be stored in the data store 240. In some embodiments, an item type conversion model may be trained by the machine learning training module 230, as further described below.

In embodiments in which the prediction module 211 predicts a likelihood of conversion for an item type by a customer using one or more item type conversion models, the prediction module 211 may access the model(s) (e.g., from the data store 240) and apply the model(s) to one or more attributes of the customer, the item type, and/or a retailer to predict the likelihood of conversion for the item type by the customer. For example, the prediction module 211 may apply the item type conversion model(s) to attributes of a customer, such as their tenure with the online system 140, dietary preferences, etc. included among customer data associated with the customer and attributes of an item type, such as a price, a sale, etc. included among item data associated with the item type. In this example, the prediction module 211 also may apply the item type conversion model(s) to attributes of a retailer associated with a retailer location from which the item type may be collected, such as a name, a geographical location, a type, etc. associated with the retailer. The prediction module 211 may then receive an output from the item type conversion model(s) corresponding to a predicted likelihood of conversion for the item type by the customer.

The ranking module 213 ranks item categories that may be included in a template shopping list generated for a customer. In some embodiments, the ranking module 213 may do so based at least in part on historical order information associated with the customer. For example, based on a frequency with which a customer previously ordered item types associated with various item categories, the ranking module 213 may rank the item categories, such that the item category associated with the most frequently purchased item types is ranked first, the item category associated with the second-most frequently purchased item types is ranked second, etc. In various embodiments, the ranking module 213 also may rank item categories based on likelihoods of conversion for the item categories by a customer predicted by the prediction module 211. For example, the ranking module 213 may rank item categories that may be included in a template shopping list generated for a customer based on a likelihood of conversion for each item category by the customer predicted by the item category conversion model(s). In this example, the ranking module 213 may rank the item categories, such that the item category associated with the highest predicted likelihood of conversion by the customer is ranked first, the item category associated with the second-highest predicted likelihood of conversion by the customer is ranked second, etc. In some embodiments, a template shopping list generated for a customer may be specific to a retailer or a retailer location. In such embodiments, the ranking module 213 may only rank item categories associated with item types included among an inventory of the retailer or the retailer location.

The ranking module 213 also ranks one or more item types associated with an item category included in a template shopping list generated for a customer. In some embodiments, the ranking module 213 may do so based at least in part on historical order information associated with the customer. For example, based on a frequency with which a customer previously ordered item types associated with an item category, the ranking module 213 may rank the item types, such that the most frequently purchased item type is ranked first, the second-most frequently purchased item type is ranked second, etc. In various embodiments, the ranking module 213 also may rank one or more item types associated with an item category based on likelihoods of conversion for the item type(s) by a customer predicted by the prediction module 211. For example, the ranking module 213 may rank item types associated with an item category included in a template shopping list generated for a customer based on a likelihood of conversion for each item type by the customer predicted by the item type conversion model(s). In this example, the ranking module 213 may rank the item types, such that the item type associated with the highest predicted likelihood of conversion by the customer is ranked first, the item type associated with the second-highest predicted likelihood of conversion by the customer is ranked second, etc. As described above, in some embodiments, a template shopping list generated for a customer may be specific to a retailer or a retailer location. In such embodiments, the ranking module 213 may only rank item types included among an inventory of the retailer or the retailer location.

The category population module 215 may generate a template shopping list for a customer by populating it with one or more item categories. The category population module 215 may do so based on a predicted likelihood of conversion for each item category by the customer. For example, the category population module 215 may populate a template shopping list with multiple item categories, in which each item category is associated with at least a threshold likelihood of conversion by a customer. As an additional example, the category population module 215 may populate a template shopping list with multiple item categories, in which the item categories are included among a threshold number of top item categories ranked by the ranking module 213 based on a predicted likelihood of conversion for each item category by a customer. In embodiments in which a template shopping list includes multiple item categories, the item categories may be ordered based on a ranking by the ranking module 213 (e.g., from highest to lowest predicted likelihood of conversion by a customer), based on an order in which item types associated with the item categories are likely to be encountered by a picker at a retailer location, or based on any other suitable types of information. In some embodiments, rather than populating a template shopping list with one or more item categories, the category population module 215 may populate the template shopping list with one or more brands or any other suitable groups that may be associated with one or more item types.

In some embodiments, a template shopping list generated for a customer may be specific to a retailer or a retailer location from which item types associated with one or more item categories included in the template shopping list are to be collected. In such embodiments, the category population module 215 also may populate the template shopping list based on information associated with the retailer/retailer location (e.g., information describing item prices, sales, or availabilities of item types included among an inventory of the retailer/retailer location received from a retailer computing system 120). For example, suppose that an inventory of a retailer location includes item types belonging to 10 item categories. In this example, the category population module 215 may generate a template shopping list for a customer that is specific to the retailer location by populating it based on the 10 item categories, such that the template shopping list only includes one or more of the 10 item categories associated with at least a threshold likelihood of conversion by the customer.

In various embodiments, a template shopping list generated for a customer also may be populated with additional types of information. In some embodiments, the category population module 215 also may populate a template shopping list with information describing a quantity of item types or a budget associated with each item category to be collected for a customer for whom the template shopping list was generated. A quantity of item types may correspond to a number of the item types, a volume of the item types, a weight of the item types, etc. For example, if a template shopping list includes a "vegetable" item category that is associated with a quantity of four item types, this indicates that four item types associated with the "vegetable" item category (e.g., "broccoli," "carrot," "cabbage," and "pepper" item types) are to be collected for a customer. As an additional example, if a template shopping list includes a "seafood" item category that is associated with a budget of $30.00, this indicates that one or more item types associated with the "seafood" item category (e.g., "fish," "shrimp," "scallop," and "crab" item types) that do not exceed a total of $30.00 are to be collected for a customer. In embodiments in which a template shopping list is populated with information describing a quantity or a budget associated with each item category, the quantity or budget may be specified based on one or more collection rules determined by the rule determination module 217, described below. In various embodiments, the category population module 215 also may populate a template shopping list with information describing one or more collection rules determined by the rule determination module 217. In such embodiments, the collection rule(s) may be associated with one or more item categories. For example, a "fruit" item category included in a template shopping list may be associated with a collection rule indicating that only fresh and organic item types associated with the "fruit" item category are to be collected for a customer. In various embodiments, one or more collection rules included in a template shopping list may not be associated with an item category. For example, a template shopping list may include a collection rule associated with all item categories associated with item types to be collected for a customer for whom the template shopping list was generated, such as a gluten-free and vegetarian dietary preference associated with the customer.

Once a template shopping list has been generated for a customer, it may be stored (e.g., in the data store 240). A template shopping list may be stored in association with user-identifying information associated with a customer (e.g., a username, an email address, a phone number, etc.) for whom the template shopping list was generated, a date that the template shopping list was generated, information identifying a retailer or retailer location associated with the template shopping list, etc. In some embodiments, a template shopping list associated with a customer may be stored once a request is received from a customer client device 100 associated with the customer to accept the template shopping list. In such embodiments, the template shopping list may first be sent for display to the customer client device 100 and a request subsequently may be received from the customer client device 100 to accept the template shopping list or to modify one or more item categories, quantities/budgets, collection rules, etc. included in the template shopping list.

In embodiments in which a request is received from a customer client device 100 to modify a template shopping list, the category population module 215 may modify the template shopping list based on the request. For example, the category population module 215 may add or remove an item category or change an order of item categories or a quantity/budget associated with an item category included in a template shopping list generated for a customer based on a request received from a customer client device 100 associated with the customer to do so. In this example, the category population module 215 similarly may add or remove a collection rule or change a collection rule included in the template shopping list for the customer based on the request received from the customer client device 100. Continuing with this example, the modified template shopping list may be sent for display to the customer client device 100 and stored (e.g., in the data store 240) upon receiving a request from the customer client device 100 to accept the template shopping list. The category population module 215 also may generate a new template shopping list and/or update an existing template shopping list periodically, based on a frequency with which a customer for whom the template shopping list was created places orders with the online system 140, based on a frequency with which a retailer or retailer location associated with the template shopping list updates its prices or receives new inventory, or based on any other suitable criteria.

The rule determination module 217 determines a set of collection rules. The rule determination module 217 may determine a set of collection rules based on various types of information associated with a customer, such as historical order information associated with the customer, dietary preferences associated with the customer, a browsing history of the customer, or any other suitable types of customer data. In some embodiments, the rule determination module 217 also may determine a set of collection rules based on outputs received from one or more machine learning models (e.g., one or more item category conversion models and/or one or more item type conversion models). A collection rule may be associated with one or more item categories, one or more item types, one or more retailers or retailer locations, etc. For example, if customer data associated with a customer indicates that the customer is on a gluten-free diet, is allergic to nuts, and is vegetarian, the rule determination module 217 may determine one or more collection rules indicating that all item types to be collected for the customer should be gluten-free, nut-free, and vegetarian. As an additional example, if an output received from the item category conversion model(s) indicates that a customer usually orders two item types associated with a "fruit" item category to be collected from a retailer location, the rule determination module 217 may determine one or more collection rules indicating that two item types associated with the "fruit" item category should be collected for the customer from the retailer location. In the above example, if an output received from the item type conversion model(s) indicates that the customer usually orders five of an "apple" item type and half a pound of a "grape" item type from the retailer location, the rule determination module 217 may determine one or more additional collection rules indicating that five of an "apple" item type and half a pound of a "grape" item type should be collected for the customer from the retailer location.

In embodiments in which a collection rule is associated with an item category, the collection rule may describe a quantity (e.g., a maximum and/or a minimum) of item types associated with the item category to be collected in an order for a customer, a quality of item types associated with the item category (e.g., fresh, organic, gluten-free, brand, firmness, ripeness, price, discount, etc.), a budget associated with the item category, or any other suitable types of collection rules. For example, suppose that previous orders placed by a customer often included at least three item types belonging to a "fruit" item category and that the customer has always specified instructions for all of the item types to be organic, as well as a total budget of $15.00 for all of the item types. In this example, suppose also that the customer often complained about moldy item types belonging to the "fruit" item category that were collected in previous orders placed by the customer. Continuing with this example, based on the previous orders and complaints, the rule determination module 217 may determine one or more collection rules indicating that at least three item types associated with a "fruit" item category should be collected in each order for the customer, that the item types should be fresh and organic, and that the item types should not exceed a budget of $15.00. As an additional example, suppose that previous orders placed by a customer often included a wide variety of item types belonging to a "meat" item category, that the item types were always associated with a sale or a discount, and that the customer has always specified a total budget of $20.00 for all of the item types. In this example, based on the previous orders, the rule determination module 217 may determine a collection rule indicating that as many of the cheapest item types associated with a "meat" item category should be collected in each order for the customer as long as a budget of $20.00 is not exceeded.

Similarly, in embodiments in which a collection rule is associated with an item type, the collection rule may describe a quantity (e.g., a maximum and/or a minimum) of the item type to be collected in an order for a customer, a quality of the item type (e.g., fresh, organic, gluten-free, size, variety, brand, firmness, ripeness, price, discount, packaging, etc.), a budget associated with the item type, or any other suitable types of collection rules. For example, suppose that previous orders placed by a customer often included a "banana" item type and that the customer usually requested at least five of a "banana" item type and often specified instructions for the "banana" item type to be slightly green as well as a budget of $3.00 for the "banana" item type. In this example, suppose also that the customer often complained about a bruised "banana" item type that was collected in previous orders placed by the customer. Continuing with this example, based on the previous orders and complaints, the rule determination module 217 may determine one or more collection rules indicating that at least five of a "banana" item type should be collected in each order for the customer, that the "banana" item type should be unbruised and slightly green, and that the "banana" item type should not exceed a budget of $3.00. As an additional example, suppose that a "bread" item type included in any previous orders placed by a customer was always gluten-free. In this example, based on the previous orders, the rule determination module 217 may determine a collection rule indicating that any "bread" item type collected for the customer should be gluten-free.

Once a set of collection rules has been determined by the rule determination module 217, it may be stored (e.g., in the data store 240). A collection rule may be stored in association with user-identifying information associated with a customer (e.g., a username, an email address, a phone number, etc.) associated with the collection rule, a date that the collection rule was created, information identifying a retailer or retailer location associated with the collection rule, or any other suitable types of information. In some embodiments, a set of collection rules may be stored once a request is received from a customer client device 100 associated with a customer to accept the set of collection rules. In such embodiments, the set of collection rules may first be sent for display to the customer client device 100 and a request subsequently may be received from the customer client device 100 to accept the set of collection rules or to modify one or more collection rules.

In embodiments in which a request is received from a customer client device 100 to modify one or more collection rules, the rule determination module 217 may modify the collection rule(s) based on the request. For example, the rule determination module 217 may add or remove a collection rule or change a collection rule included among a set of collection rules based on a request received from a customer client device 100 associated with a customer to do so. In this example, the modified set of collection rules may be sent for display to the customer client device 100 and stored (e.g., in the data store 240) upon receiving a request from the customer client device 100 to accept the set of collection rules. The rule determination module 217 also may determine a new set of collection rules and/or update an existing set of collection rules periodically, based on a frequency with which a customer associated with the set of collection rules places orders with the online system 140, or based on any other suitable criteria.

The item population module 219 may generate a suggested shopping list for a customer. It may do so by populating each item category included in a template shopping list generated for the customer with a set of item types associated with the item category and information describing a quantity or a budget associated with each item type to be collected for the customer. A quantity of an item type may correspond to a number of units of the item type (e.g., six of an "apple" item type), a volume of the item type (e.g., two liters of a "soda" item type), a weight of the item type (e.g., a pound of a "rice" item type), etc. that may be specified based on one or more collection rules determined by the rule determination module 217. The item population module 219 may populate an item category with a set of item types and information describing a quantity or a budget associated with each item type based on a ranking of item types associated with the item category by the ranking module 213 and a set of collection rules determined by the rule determination module 217. For example, the item population module 219 may generate a suggested shopping list for a customer by populating each item category included in a template shopping list generated for the customer with multiple item types. In this example, each item type may be associated with a rank describing an order in which the item type is to be collected. Continuing with this example, if the suggested shopping list includes a "potato" item type that is associated with a quantity of one pound, this indicates that one pound of the "potato" item type is to be collected for the customer. In the above example, if the suggested shopping list also includes one to two units of a "top sirloin steak" item type that is associated with a budget of $30.00, this indicates that one or two of the "top sirloin steak" item type that do not exceed a total of $30.00 are to be collected for the customer. In embodiments in which a suggested shopping list includes multiple item types associated with an item category, the item types may be ordered based on a ranking by the ranking module 213 (e.g., from highest to lowest predicted likelihood of conversion by a customer), based on an order in which they are likely to be encountered by a picker at a retailer location, or based on any other suitable types of information.

In some embodiments, a suggested shopping list generated for a customer may be specific to a retailer or a retailer location from which item types included in the suggested shopping list are to be collected. In such embodiments, the item population module 219 also may populate the suggested shopping list based on information associated with the retailer/retailer location (e.g., information describing item prices, sales, or availabilities of item types included among an inventory of the retailer/retailer location received from a retailer computing system 120). For example, suppose that an inventory of a retailer location includes 25 item types belonging to an item category and that the item category is included in a template shopping list generated for a customer. In this example, the item population module 219 may generate a suggested shopping list for the customer that is specific to the retailer location by populating the item category based on a ranking of item types associated with the item category by the ranking module 213, a set of collection rules, and availabilities, prices, sales, etc. associated with item types at the retailer location.

In various embodiments, a suggested shopping list generated for a customer also may be populated with additional types of information. In some embodiments, the item population module 219 also may populate a suggested shopping list with information describing a price, a sale, a discount, etc. associated with each item type. In such embodiments, the item population module 219 may receive this information from a retailer computing system 120 associated with a retailer location from which items included in the suggested shopping list are to be collected. In various embodiments, the item population module 219 also may populate a suggested shopping list with information describing one or more collection rules determined by the rule determination module 217. In such embodiments, the collection rule(s) may be associated with one or more item types. For example, a "blueberry" item type included in a suggested shopping list may be associated with a collection rule indicating that only a fresh and organic "blueberry" item type is to be collected for a customer. In various embodiments, one or more collection rules included in a suggested shopping list may not be associated with an item type. For example, a suggested shopping list may include a collection rule associated with all item types to be collected for a customer for whom the suggested shopping list was generated, such as a gluten-free and vegetarian dietary preference associated with the customer.

A suggested shopping list may be stored (e.g., in the data store 240) once it has been generated for a customer. A suggested shopping list may be stored in association with user-identifying information associated with a customer (e.g., a username, an email address, a phone number, etc.) for whom the suggested shopping list was generated, a date that the suggested shopping list was created, information identifying a retailer or retailer location associated with the suggested shopping list, etc. In some embodiments, a suggested shopping list associated with a customer may be stored once a request is received from a customer client device 100 associated with the customer to accept the suggested shopping list. In such embodiments, the suggested shopping list may first be sent for display to the customer client device 100 and a request subsequently may be received from the customer client device 100 to accept the suggested shopping list or to modify one or more item categories, item types, quantities, collection rules, etc. included in the suggested shopping list.

In embodiments in which a request is received from a customer client device 100 to modify a suggested shopping list, the item population module 219 may modify the suggested shopping list based on the request. For example, the item population module 219 may add or remove an item type or change an order of item types or a quantity/budget associated with an item type included in a suggested shopping list generated for a customer based on a request received from a customer client device 100 associated with the customer to do so. In this example, the item population module 219 similarly may add or remove a collection rule or change a collection rule included in the suggested shopping list for the customer based on the request received from the customer client device 100. Continuing with this example, the modified suggested shopping list may be sent for display to the customer client device 100 and stored (e.g., in the data store 240) upon receiving a request from the customer client device 100 to accept the suggested shopping list. The item population module 219 also may generate a new suggested shopping list periodically, based on a frequency with which a customer for whom the suggested shopping list was created places orders with the online system 140, based on a frequency with which a retailer or retailer location associated with the suggested shopping list updates its prices or receives new inventory, or based on any other suitable criteria.

The order management module 220 manages orders for items from customers. The order management module 220 receives orders from a customer client device 100 and assigns the orders to pickers for service based on picker data. For example, the order management module 220 assigns an order to a picker based on the picker's location and the retailer location from which the ordered items are to be collected. The order management module 220 may also assign an order to a picker based on how many items are in the order, a vehicle operated by the picker, the delivery location, the picker's preferences on how far to travel to deliver an order, the picker's ratings by customers, or how often a picker agrees to service an order.

In some embodiments, the order management module 220 determines when to assign an order to a picker based on a delivery timeframe requested by the customer who placed the order. The order management module 220 computes an estimated amount of time that it would take for a picker to collect the items for an order and deliver the ordered item to the delivery location for the order. The order management module 220 assigns the order to a picker at a time such that, if the picker immediately services the order, the picker is likely to deliver the order at a time within the timeframe. Thus, when the order management module 220 receives an order, the order management module 220 may delay in assigning the order to a picker if the timeframe is far enough in the future.

When the order management module 220 assigns an order to a picker, the order management module 220 transmits the order to the picker client device 110 associated with the picker. The order management module 220 may also transmit navigation instructions from the picker's current location to the retailer location associated with the order. If the order includes items to collect from multiple retailer locations, the order management module 220 identifies the retailer locations to the picker and may also specify a sequence in which the picker should visit the retailer locations.

A suggested shopping list generated for a customer and a set of collection rules may be sent by the order management module 220 to a picker client device 110 associated with a picker servicing an order for the customer. The suggested shopping list and the set of collection rules may be sent to the picker client device 110 once a request to accept the suggested shopping list and the set of rules has been received from a customer client device 100 associated with the customer. In some embodiments, a suggested shopping list and a set of collection rules are sent to a picker client device 110 in the form of a "flexible" shopping list, which includes or prioritizes a subset of each set of item types associated with one or more item categories included in the suggested shopping list. A flexible shopping list may be updated by the order management module 220 in response to receiving a notification from a picker client device 110 indicating one or more item types are not available, one or more collection rules are not satisfied, etc. In such embodiments, the flexible shopping list may be updated to include or prioritize an additional item type associated with an item category and information describing a quantity or a budget associated with the additional item type based on a ranking of item types associated with the item category and a set of collection rules. The updated flexible shopping list may then be sent for display to the picker client device 110. For example, suppose that for a "fruit" item category, a flexible shopping list indicates that a picker should collect a total of three item types: six fresh and organic Fuji apples, five fresh and organic green bananas, and four fresh and organic navel oranges, which were ranked first, second, and third, respectively, by the ranking module 213. In this example, if a notification is received from a picker client device 110 associated with the picker indicating that the picker is unable to collect five fresh and organic green bananas, the order management module 220 may update the flexible shopping list to include or prioritize an additional item type ranked fourth by the ranking module 213 and information describing a quantity or a budget associated with the additional item type to be collected by the picker. Continuing with this example, the updated flexible shopping list may be sent for display to the picker client device 110 and the process repeated for item types associated with progressively lower ranks until the picker indicates they have collected three item types associated with the "fruit" item category.

The order management module 220 may track the location of the picker through the picker client device 110 to determine when the picker arrives at the retailer location. When the picker arrives at the retailer location, the order management module 220 transmits the order to the picker client device 110 for display to the picker. As the picker uses the picker client device 110 to collect items at the retailer location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the customer client device 100 that describe which items have been collected for the customer's order.

In some embodiments, the order management module 220 tracks the location of the picker within the retailer location. The order management module 220 uses sensor data from the picker client device 110 or from sensors in the retailer location to determine the location of the picker in the retailer location. The order management module 220 may transmit instructions to the picker client device 110 to display a map of the retailer location indicating where in the retailer location the picker is located. Additionally, the order management module 220 may instruct the picker client device 110 to display the locations of items for the picker to collect, and may further display navigation instructions for how the picker can travel from their current location to the location of a next item to collect for an order.

The order management module 220 determines when the picker has collected all of the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the retailer location to the delivery location, or to a subsequent retailer location for further item collection. The order management module 220 tracks the location of the picker as the picker travels to the delivery location for an order, and updates the customer with the location of the picker so that the customer can track the progress of their order. In some embodiments, the order management module 220 computes an estimated time of arrival for the picker at the delivery location and provides the estimated time of arrival to the customer.

In some embodiments, the order management module 220 facilitates communication between the customer client device 100 and the picker client device 110. As noted above, a customer may use a customer client device 100 to send a message to the picker client device 110. The order management module 220 receives the message from the customer client device 100 and transmits the message to the picker client device 110 for presentation to the picker. The picker may use the picker client device 110 to send a message to the customer client device 100 in a similar manner.

The order management module 220 coordinates payment by the customer for the order. The order management module 220 uses payment information provided by the customer (e.g., a credit card number or a bank account) to receive payment for the order. In some embodiments, the order management module 220 stores the payment information for use in subsequent orders by the customer. The order management module 220 computes a total cost for the order and charges the customer that cost. The order management module 220 may provide a portion of the total cost to the picker for servicing the order, and another portion of the total cost to the retailer.

The machine learning training module 230 trains machine learning models used by the online system 140. The online system 140 may use machine learning models to perform functionalities described herein. Example machine learning models include regression models (e.g., logistic regression models), support vector machines, naïve bayes, decision trees, k nearest neighbors, random forest, boosting algorithms (e.g., boosted trees, XGBoost, LightGBM, etc.), k-means, and hierarchical clustering. The machine learning models may also include neural networks, such as perceptrons, multilayer perceptrons, convolutional neural networks, recurrent neural networks, sequence-to-sequence models, generative adversarial networks, or transformers.

Each machine learning model includes a set of parameters. A set of parameters for a machine learning model are parameters that the machine learning model uses to process an input. For example, a set of parameters for a linear regression model may include weights that are applied to each input variable in the linear combination that comprises the linear regression model. Similarly, the set of parameters for a neural network may include weights and biases that are applied at each neuron in the neural network. The machine learning training module 230 generates the set of parameters for a machine learning model by "training" the machine learning model. Once trained, the machine learning model uses the set of parameters to transform inputs into outputs.

The machine learning training module 230 trains a machine learning model based on a set of training examples. Each training example includes input data to which the machine learning model is applied to generate an output. For example, each training example may include customer data, picker data, item data, or order data. In some cases, the training examples also include a label which represents an expected output of the machine learning model. In these cases, the machine learning model is trained by comparing its output from input data of a training example to the label for the training example.

In embodiments in which the prediction module 211 accesses an item category conversion model that is trained to predict a likelihood of conversion for an item category by a customer, the machine learning training module 230 may train the item category conversion model. In some embodiments, the machine learning training module 230 also may train an item category conversion model to predict a quantity of item types associated with a conversion for an item category by a customer. The machine learning training module 230 may train the item category conversion model via supervised learning based on attributes of customers and item categories and/or retailers with which the customers interacted. Examples of attributes of customers include: historical order information associated with customers, search and browsing histories of customers, quantities of item types customers previously added to their carts, and other customer data associated with customers (e.g., tenures with the online system 140, geographical regions, dietary preferences, etc.), as described above. Examples of attributes of item categories include: quantities, prices, brands, sizes, discounts, sales, freshness, seasonality, etc. associated with item types associated with item categories. Examples of attributes of retailers include: names, geographical locations, types, etc. associated with retailers.

To illustrate an example of how an item category conversion model may be trained, suppose that the machine learning training module 230 receives a set of training examples. In this example, the set of training examples may include attributes of a customer (e.g., dietary preferences, average amount spent on previous orders, a discount affinity of the customer, a price sensitivity of the customer, etc.). In the above example, the set of training examples also may include attributes of item categories (e.g., a quantity of item types associated with each item category and prices, discounts, sales, etc. associated with the item types) and attributes of retailers (e.g., names, geographical locations, types, etc.) with which the customer interacted. In this example, the machine learning training module 230 also may receive labels which represent expected outputs of the item category conversion model, in which a label indicates whether the customer purchased an item type associated with an item category in a previous order. Alternatively, in this example, a label may indicate a quantity of item types associated with an item category purchased by the customer in a previous order, such that the expected outputs of the item category conversion model correspond to predicted numbers of item types associated with item categories likely to be purchased by the customer in an order. Continuing with this example, the machine learning training module 230 may then train the item category conversion model based on the attributes of the customer, item categories, and/or retailers, as well as the labels by comparing its output from input data of each training example to the label for the training example.

In embodiments in which the prediction module 211 accesses an item type conversion model that is trained to predict a likelihood of conversion for an item type by a customer, the machine learning training module 230 may train the item type conversion model. In some embodiments, the machine learning training module 230 also may train an item type conversion model to predict a quantity of an item type associated with a conversion by a customer. The machine learning training module 230 may train the item type conversion model via supervised learning based on attributes of customers and item types and/or retailers with which the customers interacted. Examples of attributes of customers include: historical order information associated with customers, search and browsing histories of customers, quantities of item types customers previously added to their carts, and other customer data associated with customers (e.g., tenures with the online system 140, geographical regions, dietary preferences, etc.), as described above. Examples of attributes of item types include: quantities, prices, brands, sizes, discounts, sales, freshness, seasonality, item categories, etc. associated with item types. Examples of attributes of retailers include: names, geographical locations, types, etc. associated with retailers.

To illustrate an example of how an item type conversion model may be trained, suppose that the machine learning training module 230 receives a set of training examples. In this example, the set of training examples may include attributes of a customer (e.g., dietary preferences, average amount spent on previous orders, a discount affinity of the customer, a price sensitivity of the customer, etc.). In the above example, the set of training examples also may include attributes of item types (e.g., a quantity of each item type and prices, discounts, sales, etc. associated with the item types) and attributes of retailers (e.g., names, geographical locations, types, etc.) with which the customer interacted. In this example, the machine learning training module 230 also may receive labels which represent expected outputs of the item type conversion model, in which a label indicates whether the customer purchased an item type in a previous order. Alternatively, in this example, a label may indicate a quantity of an item type purchased by the customer in a previous order, such that the expected outputs of the item type conversion model correspond to predicted numbers of item types likely to be purchased by the customer in an order. Continuing with this example, the machine learning training module 230 may then train the item type conversion model based on the attributes of the customer, item types, and/or retailers, as well as the labels by comparing its output from input data of each training example to the label for the training example.

The machine learning training module 230 may apply an iterative process to train a machine learning model whereby the machine learning training module 230 trains the machine learning model on each of the set of training examples. To train a machine learning model based on a training example, the machine learning training module 230 applies the machine learning model to the input data in the training example to generate an output. The machine learning training module 230 scores the output from the machine learning model using a loss function. A loss function is a function that generates a score for the output of the machine learning model such that the score is higher when the machine learning model performs poorly and lower when the machine learning model performs well. In cases where the training example includes a label, the loss function is also based on the label for the training example. Some example loss functions include the mean square error function, the mean absolute error, the hinge loss function, and the cross-entropy loss function. The machine learning training module 230 updates the set of parameters for the machine learning model based on the score generated by the loss function. For example, the machine learning training module 230 may apply gradient descent to update the set of parameters.

The data store 240 stores data used by the online system 140. For example, the data store 240 stores customer data, item data, order data, and picker data for use by the online system 140. As described above, the data store 240 also may store template shopping lists, suggested shopping lists, and collection rules. The data store 240 also stores trained machine learning models (e.g., one or more item category conversion models and/or one or more item type conversion models) trained by the machine learning training module 230. For example, the data store 240 may store the set of parameters for a trained machine learning model on one or more non-transitory, computer-readable media. The data store 240 uses computer-readable media to store data, and may use databases to organize the stored data.

As the data collection module 200 collects order information associated with a customer, the order information may be included among historical order information associated with the customer stored in the data store 240. Examples of historical order information associated with a customer include: a time (e.g., date and time of day) at which the customer placed a previous order, a total number of items included in a previous order placed by the customer, and/or a total amount spent by the customer on a previous order. Additional examples of historical information associated with a customer include: information associated with each item previously ordered by the customer, such as its name, item category, quantity (e.g., number of units, weight, volume, etc.), price, stock keeping unit (SKU), serial number, model, size, dimension(s), color(s), quality/qualities, brand, seasonality, freshness, ingredient(s), material(s), manufacturing location, whether it was on sale or discounted, etc. Examples of historical order information associated with a customer also may include: feedback associated with a previous order (e.g., a rating, a complaint, a compliment, etc.), a refund (e.g., full or partial) for a previous order, an instruction associated with collecting or replacing an item type included in a previous order, and/or any other suitable types of information describing the customer's order history. For example, historical order information associated with a customer may include information associated with a refund issued to a customer for a previous order (e.g., one or more item types associated with the refund, an amount of the refund, a reason for the refund, etc.).

Figure 3:
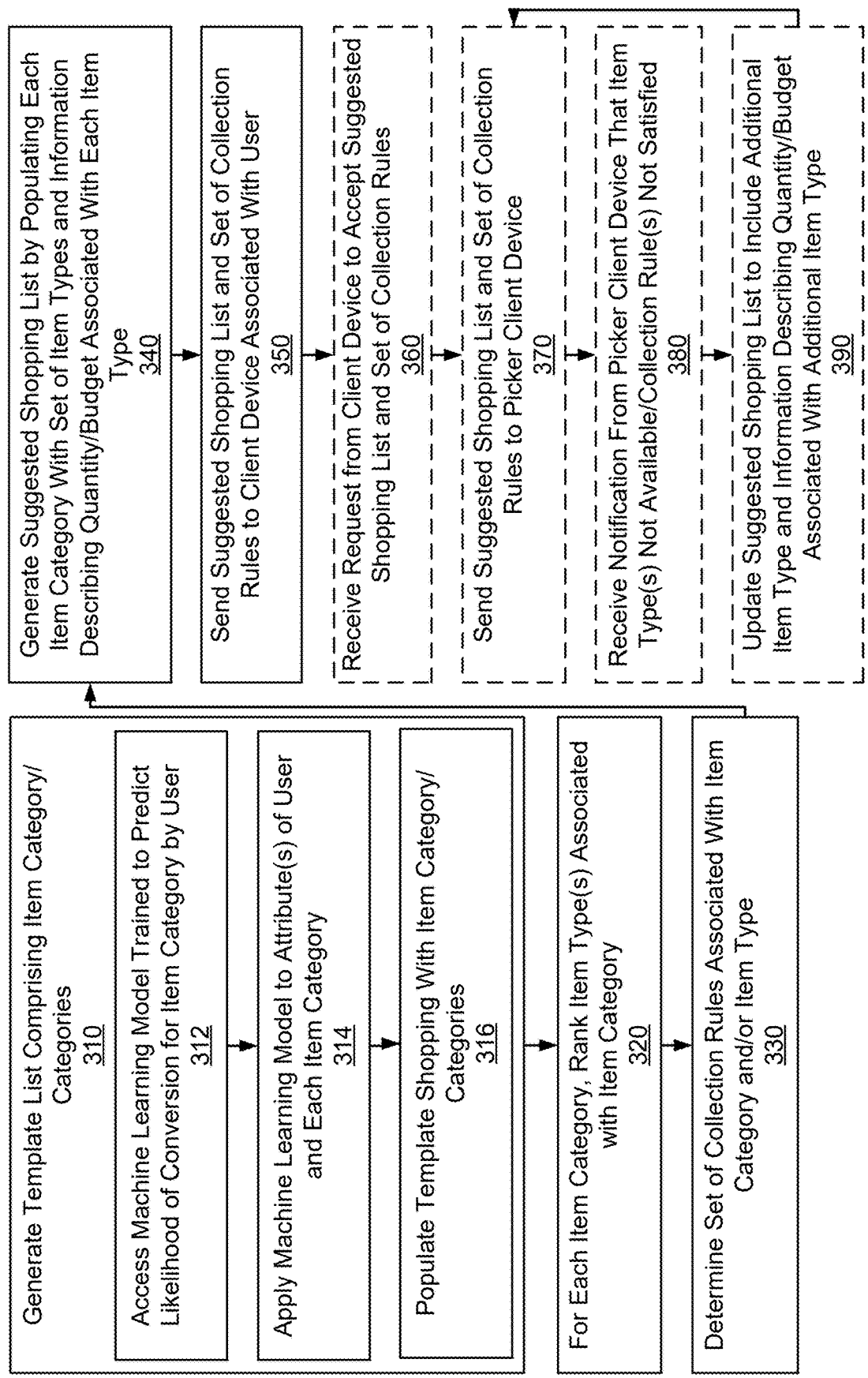
FIG. 3 is a flowchart of a method for generating a suggested shopping list by populating a template shopping list of item categories with item types and quantities based on a set of collection rules, in accordance with one or more embodiments.

Generating a Suggested Shopping List by Populating a Template Shopping List of Item Categories with Item Types and Quantities Based on a Set of Collection Rules FIG. 3 is a flowchart of a method for generating a suggested shopping list by populating a template shopping list of item categories with item types and quantities based on a set of collection rules, in accordance with one or more embodiments. Alternative embodiments may include more, fewer, or different steps from those illustrated in FIG. 3, and the steps may be performed in a different order from that illustrated in FIG. 3. These steps may be performed by an online system (e.g., online system 140), such as an online concierge system. Additionally, each of these steps may be performed automatically by the online system without human intervention.

The online system 140 generates 310 (e.g., via the category population module 215) a template shopping list that includes one or more item categories. In some embodiments, to generate 310 the template shopping list, the online system 140 may predict (e.g., using the prediction module 211) likelihoods of conversion for item categories by the customer. A likelihood of conversion for an item category by the customer indicates a likelihood that the customer will order one or more item types associated with the item category. The online system 140 may make the prediction based at least in part on historical order information associated with the customer. For example, based on information describing item types associated with an item category previously ordered by the customer (e.g., quantity ordered, frequency ordered, prices/discounts associated with the item types, retailer locations from which the item types were collected, etc.), the online system 140 may predict a likelihood of conversion for the item category by the customer. In some embodiments, a predicted likelihood of conversion for an item category by the customer may be specific to a retailer or a retailer location. In various embodiments, the online system 140 also may predict a likelihood of conversion for an item category by the customer based on additional types of information. Examples of such information include: customer data associated with the customer (e.g., dietary preferences, search history, browsing history, etc.), item data associated with item types with which the customer interacted, information associated with retailers with which the customer interacted, and/or any other suitable types of information. For example, the online system 140 also may predict a likelihood of conversion for an item category by the customer based on information describing prices, item categories, brands, sizes, sales, discounts, quantities, freshness, seasonality, etc. associated with item types searched, browsed, or added to a cart by the customer. In the above example, the online system 140 also may predict the likelihood of conversion for the item category by the customer based on a geographical region and dietary preferences associated with the customer, an average amount the customer spent on each order, and a name, a type, a geographical location, etc. associated with each retailer with which the customer interacted.

In embodiments in which less than a threshold amount of historical order information or other information associated with the customer is available, the online system 140 also or alternatively may predict likelihoods of conversion for item categories by the customer based on historical order information or other information associated with other customers. For example, suppose that customer data associated with the customer describes a tenure of the customer with the online system 140 that is less than a threshold number of months or indicates that the customer has placed fewer than a threshold number of orders with the online system 140. In this example, the online system 140 may predict a likelihood of conversion for an item category by the customer based on historical order information or other data (e.g., customer data) associated with other customers (e.g., all customers, customers in the same geographical region, customers with the same dietary preferences, customers with similar browsing histories, etc.).

In some embodiments, the online system 140 may predict a likelihood of conversion for an item category by the customer using one or more item category conversion models. An item category conversion model is a machine learning model that is trained to predict a likelihood of conversion for an item category by a customer based at least in part on historical order information associated with the customer. For example, an item category conversion model may be trained to predict a likelihood that a customer will order one or more item types associated with an item category. In various embodiments, an item category conversion model also may be trained based on additional types of information associated with the customer. Examples of such information include: customer data associated with the customer, item data associated with item types with which the customer interacted, information associated with retailers with which the customer interacted, etc., as described above. In some embodiments, an item category conversion model uses item category embeddings describing item categories and customer embeddings describing customers to predict likelihoods of conversion for item categories by customers. These item category embeddings and customer embeddings may be generated by separate machine learning models and may be stored in the online system 140 (e.g., in the data store 240). In some embodiments, an item category conversion model may be trained by the online system 140 (e.g., using the machine learning training module 230).

In embodiments in which the online system 140 predicts a likelihood of conversion for an item category by the customer using one or more item category conversion models, the online system 140 may access 312 (e.g., using the prediction module 211) the model(s) (e.g., from the data store 240) and apply 314 (e.g., using the prediction module 211) the model(s) to one or more attributes of the customer, the item category, and/or a retailer to predict the likelihood of conversion for the item category by the customer. For example, the online system 140 may apply 314 the item category conversion model(s) to attributes of the customer, such as their tenure with the online system 140, dietary preferences, etc. included among customer data associated with the customer and attributes of an item category, such as a price, a sale, etc. included among item data associated with item types associated with the item category. In this example, the online system 140 also may apply 314 the item category conversion model(s) to attributes of a retailer associated with a retailer location from which the item types associated with the item category may be collected, such as a name, a geographical location, a type, etc. associated with the retailer. The online system 140 may then receive an output from the item category conversion model(s) corresponding to a predicted likelihood of conversion for the item category by the customer.

In some embodiments, the online system 140 may rank (e.g., using the ranking module 213) item categories that may be included in the template shopping list generated 310 for the customer. In some embodiments, the online system 140 may do so based at least in part on historical order information associated with the customer. For example, based on a frequency with which the customer previously ordered item types associated with various item categories, the online system 140 may rank the item categories, such that the item category associated with the most frequently purchased item types is ranked first, the item category associated with the second-most frequently purchased item types is ranked second, etc. In various embodiments, the online system 140 also may rank item categories based on likelihoods of conversion for the item categories by the customer predicted by the online system 140. For example, the online system 140 may rank item categories that may be included in the template shopping list generated 310 for the customer based on a likelihood of conversion for each item category by the customer predicted by the item category conversion model(s). In this example, the online system 140 may rank the item categories, such that the item category associated with the highest predicted likelihood of conversion by the customer is ranked first, the item category associated with the second-highest predicted likelihood of conversion by the customer is ranked second, etc. In some embodiments, the template shopping list generated 310 for the customer may be specific to a retailer or a retailer location. In such embodiments, the online system 140 may only rank item categories associated with item types included among an inventory of the retailer or the retailer location.

To generate 310 the template shopping list for the customer, the online system 140 may then populate 316 (e.g., using the category population module 215) the template shopping list with the one or more item categories. The online system 140 may do so based on a predicted likelihood of conversion for each item category by the customer. For example, the online system 140 may populate 316 the template shopping list with multiple item categories, in which each item category is associated with at least a threshold likelihood of conversion by the customer. As an additional example, the online system 140 may populate 316 the template shopping list with multiple item categories, in which the item categories are included among a threshold number of top item categories ranked (e.g., by the ranking module 213) based on a predicted likelihood of conversion for each item category by the customer. In embodiments in which the template shopping list includes multiple item categories, the item categories may be ordered based on a ranking (e.g., by the ranking module 213 from highest to lowest predicted likelihood of conversion by the customer), based on an order in which item types associated with the item categories are likely to be encountered by a picker at a retailer location, or based on any other suitable types of information. For example, as shown in FIG. 4A, which illustrates an example of a template shopping list 400, in accordance with one or more embodiments, item categories 405 included in the template shopping list 400 may be ordered based on their rank 403, such that the "fruit" item with a highest rank 403 is at the top, followed by the "vegetable" item category 405 with a second-highest rank 403, etc. In some embodiments, rather than populating 316 the template shopping list 400 with one or more item categories 405, the online system 140 may populate 316 the template shopping list 400 with one or more brands or any other suitable groups that may be associated with one or more item types.

As described above, in some embodiments, the template shopping list 400 generated 310 for the customer may be specific to a retailer or a retailer location from which item types associated with the one or more item categories 405 included in the template shopping list 400 are to be collected. In such embodiments, the online system 140 also may populate 316 the template shopping list 400 based on information associated with the retailer/retailer location (e.g., information describing item prices, sales, or availabilities of item types included among an inventory of the retailer/retailer location received from a retailer computing system 120). For example, suppose that an inventory of a retailer location includes item types belonging to 10 item categories 405. In this example, the online system 140 may generate 310 the template shopping list 400 for the customer that is specific to the retailer location by populating 316 it based on the 10 item categories 405, such that the template shopping list 400 only includes one or more of the 10 item categories 405 associated with at least a threshold likelihood of conversion by the customer.

In various embodiments, the template shopping list 400 generated 310 for the customer also may be populated 316 with additional types of information. In some embodiments, the online system 140 also may populate 316 the template shopping list 400 with information describing a quantity of item types or a budget associated with each item category 405 to be collected for the customer. A quantity of item types may correspond to a number of the item types, a volume of the item types, a weight of the item types, etc. As shown in the example of FIG. 4A, if the template shopping list 400 includes a "vegetable" item category 405 that is associated with a quantity/budget 407 of six item types, this indicates that six item types associated with the "vegetable" item category 405 (e.g., "broccoli," "carrot," "cabbage," "pepper," "kale," and "eggplant" item types) are to be collected for the customer. As an additional example, if the template shopping list 400 includes a "meat" item category 405 that is associated with a budget 407 of $30.00, this indicates that one or more item types associated with the "meat" item category 405 (e.g., "ground beef," "chicken wings," and "turkey sausage" item types) that do not exceed a total of $30.00 are to be collected for the customer. In embodiments in which the template shopping list 400 is populated 316 with information describing a quantity/budget 407 associated with each item category 405, the quantity/budget 407 may be specified based on one or more collection rules determined 330 by the online system 140 (e.g., using the rule determination module 217), as described below. In various embodiments, the online system 140 also may populate 316 the template shopping list 400 with information describing one or more collection rules determined 330 by the online system 140. In such embodiments, the collection rule(s) may be associated with one or more item categories 405. As shown in the example of FIG. 4A, the "fruit" item category 405 included in the template shopping list 400 may be associated with a collection rule 410 indicating that only fresh and organic item types associated with the "fruit" item category 405 are to be collected for the customer. In various embodiments, one or more collection rules 410 included in the template shopping list 400 may not be associated with an item category 405. For example, the template shopping list 400 may include a collection rule 410 associated with all item categories 405 associated with item types to be collected for the customer, such as a gluten-free and vegetarian dietary preference associated with the customer.

Once the template shopping list 400 has been generated 310 for the customer, it may be stored (e.g., in the data store 240). The template shopping list 400 may be stored in association with user-identifying information associated with the customer (e.g., a username, an email address, a phone number, etc.), a date that the template shopping list 400 was generated 310, information identifying a retailer or retailer location associated with the template shopping list 400, etc. In some embodiments, the template shopping list 400 may be stored once a request is received from a customer client device 100 associated with the customer to accept the template shopping list 400. In such embodiments, the template shopping list 400 may first be sent for display to the customer client device 100 and a request subsequently may be received from the customer client device 100 to accept the template shopping list 400 or to modify one or more item categories 405, quantities/budgets 407, collection rules 410, etc. included in the template shopping list 400.

In embodiments in which a request is received from the customer client device 100 to modify the template shopping list 400, the online system 140 may modify (e.g., using the category population module 215) the template shopping list 400 based on the request. For example, the online system 140 may add or remove an item category 405 or change an order of item categories 405 or a quantity/budget 407 associated with an item category 405 included in the template shopping list 400 based on a request received from the customer client device 100 associated with the customer to do so. In this example, the online system 140 similarly may add or remove a collection rule 410 or change a collection rule 410 included in the template shopping list 400 for the customer based on the request received from the customer client device 100. Continuing with this example, the modified template shopping list 400 may be sent for display to the customer client device 100 and stored (e.g., in the data store 240) upon receiving a request from the customer client device 100 to accept the template shopping list 400. The online system 140 also may generate 310 a new template shopping list 400 and/or update an existing template shopping list 400 periodically, based on a frequency with which the customer places orders with the online system 140, based on a frequency with which a retailer or retailer location associated with the template shopping list 400 updates its prices or receives new inventory, or based on any other suitable criteria.

The online system 140 also may predict (e.g., using the prediction module 211) likelihoods of conversion for item types by the customer. A likelihood of conversion for an item type by the customer indicates a likelihood that the customer will order the item type. The online system 140 may make the prediction based at least in part on historical order information associated with the customer. For example, based on information describing an item type previously ordered by the customer (e.g., quantity ordered, frequency ordered, prices/discounts associated with the item type, retailer locations from which the item type was collected, etc.), the online system 140 may predict a likelihood of conversion for the item type by the customer. In some embodiments, a predicted likelihood of conversion for an item type by the customer may be specific to a retailer or a retailer location. In various embodiments, the online system 140 also may predict a likelihood of conversion for an item type by the customer based on additional types of information. Examples of such information include: customer data associated with the customer (e.g., dietary preferences, search history, browsing history, etc.), item data associated with item types with which the customer interacted, information associated with retailers with which the customer interacted, and/or any other suitable types of information. For example, the online system 140 also may predict a likelihood of conversion for an item type by the customer based on information describing prices, item categories 405, brands, sizes, sales, discounts, quantities, freshness, seasonality, etc. associated with item types searched, browsed, or added to a cart by the customer. In the above example, the online system 140 also may predict the likelihood of conversion for the item type by the customer based on a geographical region and dietary preferences associated with the customer, an average amount the customer spent on each order, and a name, a type, a geographical location, etc. associated with each retailer with which the customer interacted.

In embodiments in which less than a threshold amount of historical order information or other information associated with the customer is available, the online system 140 also or alternatively may predict likelihoods of conversion for item types by the customer based on historical order information or other information associated with other customers. For example, suppose that customer data associated with the customer describes a tenure of the customer with the online system 140 that is less than a threshold number of months or indicates that the customer has placed fewer than a threshold number of orders with the online system 140. In this example, the online system 140 may predict a likelihood of conversion for an item type by the customer based on historical order information or other data (e.g., customer data) associated with other customers (e.g., all customers, customers in the same geographical region, customers with the same dietary preferences, customers with similar browsing histories, etc.).

In some embodiments, the online system 140 may predict a likelihood of conversion for an item type by the customer using one or more item type conversion models. An item type conversion model is a machine learning model that is trained to predict a likelihood of conversion for an item type by a customer based at least in part on historical order information associated with the customer. For example, an item type conversion model may be trained to predict a likelihood that a customer will order an item type. In various embodiments, an item type conversion model also may be trained based on additional types of information associated with the customer. Examples of such information include: customer data associated with the customer, item data associated with item types with which the customer interacted, information associated with retailers with which the customer interacted, etc., as described above. In some embodiments, an item type conversion model uses item type embeddings describing item types and customer embeddings describing customers to predict likelihoods of conversion for item types by customers. These item type embeddings and customer embeddings may be generated by separate machine learning models and may be stored (e.g., in the data store 240). In some embodiments, an item type conversion model may be trained by the online system 140 (e.g., using the machine learning training module 230).

In embodiments in which the online system 140 predicts a likelihood of conversion for an item type by the customer using one or more item type conversion models, the online system 140 may access (e.g., using the prediction module 211) the model(s) (e.g., from the data store 240) and apply (e.g., using the prediction module 211) the model(s) to one or more attributes of the customer, the item type, and/or a retailer to predict the likelihood of conversion for the item type by the customer. For example, the online system 140 may apply the item type conversion model(s) to attributes of the customer, such as their tenure with the online system 140, dietary preferences, etc. included among customer data associated with the customer and attributes of an item type, such as a price, a sale, etc. included among item data associated with the item type. In this example, the online system 140 also may apply the item type conversion model(s) to attributes of a retailer associated with a retailer location from which the item type may be collected, such as a name, a geographical location, a type, etc. associated with the retailer. The online system 140 may then receive an output from the item type conversion model(s) corresponding to a predicted likelihood of conversion for the item type by the customer.

Referring back to FIG. 3, for each item category 405 of the one or more item categories 405 included in the template shopping list 400, the online system 140 ranks 320 (e.g., using the ranking module 213) one or more item types associated with a corresponding item category 405. In some embodiments, the online system 140 may do so based at least in part on the historical order information associated with the customer. For example, based on a frequency with which the customer previously ordered item types associated with an item category 405, the online system 140 may rank 320 the item types, such that the most frequently purchased item type is ranked 320 first, the second-most frequently purchased item type is ranked 320 second, etc. In various embodiments, the online system 140 also may rank 320 one or more item types associated with an item category 405 based on likelihoods of conversion for the item type(s) by the customer predicted by the online system 140. For example, the online system 140 may rank (step 320) item types associated with an item category 405 included in the template shopping list 400 based on a likelihood of conversion for each item type by the customer predicted by the item type conversion model(s). In this example, the online system 140 may rank 320 the item types, such that the item type associated with the highest predicted likelihood of conversion by the customer is ranked 320 first, the item type associated with the second-highest predicted likelihood of conversion by the customer is ranked 320 second, etc. As described above, in some embodiments, the template shopping list 400 generated 310 for the customer may be specific to a retailer or a retailer location. In such embodiments, the online system 140 may only rank (step 320) item types included among an inventory of the retailer or the retailer location.

The online system 140 then determines 330 (e.g., using the rule determination module 217) a set of collection rules 410. The online system 140 may determine 330 the set of collection rules 410 based on various types of information associated with the customer, such as historical order information associated with the customer, dietary preferences associated with the customer, a browsing history of the customer, or any other suitable types of customer data. In some embodiments, the online system 140 also may determine 330 the set of collection rules 410 based on outputs received from one or more machine learning models (e.g., one or more item category conversion models and/or one or more item type conversion models). A collection rule 410 may be associated with one or more item categories 405, one or more item types, one or more retailers or retailer locations, etc. For example, if customer data associated with the customer indicates that the customer is on a gluten-free diet, is allergic to nuts, and is vegetarian, the online system 140 may determine 330 one or more collection rules 410 indicating that all item types to be collected for the customer should be gluten-free, nut-free, and vegetarian. As an additional example, if an output received from the item category conversion model(s) indicates that the customer usually orders two item types associated with a "fruit" item category 405 to be collected from a retailer location, the online system 140 may determine 330 one or more collection rules 410 indicating that two item types associated with the "fruit" item category 405 should be collected for the customer from the retailer location. In the above example, if an output received from the item type conversion model(s) indicates that the customer usually orders five of an "apple" item type and half a pound of a "grape" item type from the retailer location, the online system 140 may determine 330 one or more additional collection rules 410 indicating that five of an "apple" item type and half a pound of a "grape" item type should be collected for the customer from the retailer location.

In embodiments in which a collection rule 410 is associated with an item category 405, the collection rule 410 may describe a quantity 407 (e.g., a maximum and/or a minimum) of item types associated with the item category 405 to be collected in an order for the customer, a quality of item types associated with the item category 405 (e.g., fresh, organic, gluten-free, brand, firmness, ripeness, price, discount, etc.), a budget 407 associated with the item category 405, or any other suitable types of collection rules 410. For example, suppose that previous orders placed by the customer often included at least three item types belonging to a "fruit" item category 405 and that the customer has always specified instructions for all of the item types to be organic, as well as a total budget 407 of $15.00 for all of the item types. In this example, suppose also that the customer often complained about moldy item types belonging to the "fruit" item category 405 that were collected in previous orders placed by the customer. Continuing with this example, based on the previous orders and complaints, the online system 140 may determine 330 one or more collection rules 410 indicating that at least three item types associated with a "fruit" item category 405 should be collected in each order for the customer, that the item types should be fresh and organic, and that the item types should not exceed a budget 407 of $15.00. As an additional example, suppose that previous orders placed by the customer often included a wide variety of item types belonging to a "meat" item category 405, that the item types were always associated with a sale or a discount, and that the customer has always specified a total budget 407 of $20.00 for all of the item types. In this example, based on the previous orders, the online system 140 may determine 330 a collection rule 410 indicating that as many of the cheapest item types associated with a "meat" item category 405 should be collected in each order for the customer as long as a budget 407 of $20.00 is not exceeded.

Similarly, in embodiments in which a collection rule 410 is associated with an item type, the collection rule 410 may describe a quantity 407 (e.g., a maximum and/or a minimum) of the item type to be collected in an order for the customer, a quality of the item type (e.g., fresh, organic, gluten-free, size, variety, brand, firmness, ripeness, price, discount, packaging, etc.), a budget 407 associated with the item type, or any other suitable types of collection rules 410. For example, suppose that previous orders placed by the customer often included a "banana" item type and that the customer usually requested at least five of a "banana" item type and often specified instructions for the "banana" item type to be slightly green as well as a budget 407 of $3.00 for the "banana" item type. In this example, suppose also that the customer often complained about a bruised "banana" item type that was collected in previous orders placed by the customer. Continuing with this example, based on the previous orders and complaints, the online system 140 may determine 330 one or more collection rules 410 indicating that at least five of a "banana" item type should be collected in each order for the customer, that the "banana" item type should be unbruised and slightly green, and that the "banana" item type should not exceed a budget 407 of $3.00. As an additional example, suppose that a "bread" item type included in any previous orders placed by the customer was always gluten-free. In this example, based on the previous orders, the online system 140 may determine 330 a collection rule 410 indicating that any "bread" item type collected for the customer should be gluten-free.

Once the set of collection rules 410 has been determined 330 by the online system 140, it may be stored (e.g., in the data store 240). A collection rule 410 may be stored in association with user-identifying information associated with the customer (e.g., a username, an email address, a phone number, etc.), a date that the collection rule 410 was created, information identifying a retailer or retailer location associated with the collection rule 410, or any other suitable types of information. In some embodiments, the set of collection rules 410 may be stored once a request is received from a customer client device 100 associated with the customer to accept the set of collection rules 410. In such embodiments, the set of collection rules 410 may first be sent for display to the customer client device 100 and a request subsequently may be received from the customer client device 100 to accept the set of collection rules 410 or to modify one or more collection rules 410.

In embodiments in which a request is received from the customer client device 100 to modify one or more collection rules 410, the online system 140 may modify (e.g., using the rule determination module 217) the collection rule(s) 410 based on the request. For example, the online system 140 may add or remove a collection rule 410 or change a collection rule 410 included among the set of collection rules 410 based on a request received from the customer client device 100 associated with the customer to do so. In this example, the modified set of collection rules 410 may be sent for display to the customer client device 100 and stored (e.g., in the data store 240) upon receiving a request from the customer client device 100 to accept the set of collection rules 410. The online system 140 also may determine 330 a new set of collection rules 410 and/or update an existing set of collection rules 410 periodically, based on a frequency with which the customer places orders with the online system 140, or based on any other suitable criteria.

The online system 140 then generates 340 (e.g., using the item population module 219) a suggested shopping list for the customer. The online system 140 may do so by populating each item category 405 included in the template shopping list 400 generated 310 for the customer with a set of item types associated with the item category 405 and information describing a quantity/budget 407 associated with each item type to be collected for the customer. A quantity 407 of an item type may correspond to a number of units of the item type (e.g., six of an "apple" item type), a volume of the item type (e.g., two liters of a "soda" item type), a weight of the item type (e.g., a pound of a "rice" item type), etc. that may be specified based on one or more collection rules 410 determined 330 by the online system 140. The online system 140 may populate an item category 405 with a set of item types and information describing a quantity/budget 407 associated with each item type based on the ranking of item types associated with the item category 405 and the set of collection rules 410. As shown in FIG. 4B, which illustrates an example of a suggested shopping list 402, in accordance with one or more embodiments, and continues the example described above in conjunction with FIG. 4A, the online system 140 may generate 340 the suggested shopping list 402 for the customer by populating each item category 405 included in the template shopping list 400 with multiple item types 415. In this example, each item type 415 may be associated with a rank 403 describing an order in which the item type 415 is to be collected. Continuing with this example, if the suggested shopping list 402 includes a "peach" item type 415 that is associated with a quantity 407B of four, this indicates that four of the "peach" item type 415 are to be collected for the customer. In the above example, if the suggested shopping list 402 alternatively included four or more of the "peach" item type 415 that is associated with a budget 407 of $8.00, this indicates that four or more of the "peach" item type 415 that do not exceed a total of $8.00 are to be collected for the customer. In embodiments in which the suggested shopping list 402 includes multiple item types 415 associated with an item category 405, the item types 415 may be ordered based on the ranking by the online system 140 (e.g., from highest to lowest predicted likelihood of conversion by the customer), based on an order in which they are likely to be encountered by a picker at a retailer location, or based on any other suitable types of information.

In some embodiments, the suggested shopping list 402 generated 340 for the customer may be specific to a retailer or a retailer location from which item types 415 included in the suggested shopping list 402 are to be collected. In such embodiments, the online system 140 also may populate the suggested shopping list 402 based on information associated with the retailer/retailer location (e.g., information describing item prices, sales, or availabilities of item types 415 included among an inventory of the retailer/retailer location received from a retailer computing system 120). For example, suppose that an inventory of a retailer location includes 25 item types 415 belonging to an item category 405 and that the item category 405 is included in the template shopping list 400 generated 310 for the customer. In this example, the online system 140 may generate 340 the suggested shopping list 402 for the customer that is specific to the retailer location by populating the item category 405 based on the ranking of item types 415 associated with the item category 405, the set of collection rules 410, and availabilities, prices, sales, etc. associated with item types 415 at the retailer location.

In various embodiments, the suggested shopping list 402 also may be populated with additional types of information. In some embodiments, the online system 140 also may populate the suggested shopping list 402 with information describing a price, a sale, a discount, etc. associated with each item type 415. In such embodiments, the online system 140 may receive this information from a retailer computing system 120 associated with a retailer location from which items included in the suggested shopping list 402 are to be collected. In various embodiments, the online system 140 also may populate the suggested shopping list 402 with information describing one or more collection rules 410 determined 330 by the online system 140. In such embodiments, the collection rule(s) 410 may be associated with one or more item types 415. As shown in the example of FIG. 4B, a "banana" item type 415 included in the suggested shopping list 402 may be associated with a collection rule 410B indicating that only a green "banana" item type 415 is to be collected for the customer. In various embodiments, one or more collection rules 410 included in the suggested shopping list 402 may not be associated with an item type 415. For example, the suggested shopping list 402 may include a collection rule 410 associated with all item types 415 to be collected for the customer, such as a gluten-free and vegetarian dietary preference associated with the customer.

The suggested shopping list 402 may be stored (e.g., in the data store 240) once it has been generated 340 for the customer. The suggested shopping list 402 may be stored in association with user-identifying information associated with the customer (e.g., a username, an email address, a phone number, etc.), a date that the suggested shopping list 402 was created, information identifying a retailer or retailer location associated with the suggested shopping list 402, etc. Referring again to FIG. 3, in some embodiments, the suggested shopping list 402 may be sent 350 (e.g., by the content presentation module 210) for display to a customer client device 100 associated with the customer, a request subsequently may be received 360 (e.g., via the content presentation module 210) from the customer client device 100 to accept the suggested shopping list 402, and the suggested shopping list 402 may then be stored. Alternatively, in some embodiments, once the suggested shopping list 402 is sent 350 for display to the customer client device 100, a request subsequently may be received from the customer client device 100 to modify one or more item categories 405, item types 415, quantities/budgets 407, collection rules 410, etc. included in the suggested shopping list 402.

In embodiments in which a request is received from the customer client device 100 associated with the customer to modify the suggested shopping list 402, the online system 140 may modify (e.g., using the item population module 219) the suggested shopping list 402 based on the request. For example, the online system 140 may add or remove an item type 415 or change an order of item types 415 or a quantity/budget 407 associated with an item type 415 included in the suggested shopping list 402 based on a request received from the customer client device 100 associated with the customer to do so. In this example, the online system 140 similarly may add or remove a collection rule 410 or change a collection rule 410 included in the suggested shopping list 402 for the customer based on the request received from the customer client device 100. Continuing with this example, the modified suggested shopping list 402 may be sent 350 for display to the customer client device 100 and stored (e.g., in the data store 240) upon receiving 360 a request from the customer client device 100 to accept the suggested shopping list 402. The online system 140 also may generate 340 a new suggested shopping list 402 periodically, based on a frequency with which the customer places orders with the online system 140, based on a frequency with which a retailer or retailer location associated with the suggested shopping list 402 updates its prices or receives new inventory, or based on any other suitable criteria.

The suggested shopping list 402 and the set of collection rules 410 may be sent 370 (e.g., by the order management module 220) to a picker client device 110 associated with a picker servicing a new order for the customer. The suggested shopping list 402 and the set of collection rules 410 may be sent 370 to the picker client device 110 once a request to accept the suggested shopping list 402 and the set of rules has been received 360 from the customer client device 100 associated with the customer. In some embodiments, the suggested shopping list 402 and the set of collection rules 410 are sent 370 to the picker client device 110 in the form of a "flexible" shopping list, which includes or prioritizes a subset of each set of item types 415 associated with one or more item categories 405 included in the suggested shopping list 402. The flexible shopping list may be updated 390 (e.g., by the order management module 220) in response to receiving 380 (e.g., via the order management module 220) a notification from the picker client device 110 indicating one or more item types 415 are not available, one or more collection rules 410 are not satisfied, etc. In such embodiments, the flexible shopping list may be updated 390 to include or prioritize an additional item type 415 associated with an item category 405 and information describing a quantity/budget 407 associated with the additional item type 415 based on the ranking of item types 415 associated with the item category 405 and the set of collection rules 410. The updated flexible shopping list may then be sent 370 for display to the picker client device 110.

FIGS. 4C-4D illustrate examples of a flexible shopping list 404, in accordance with one or more embodiments, and continue the example described above in conjunction with FIGS. 4A-4B. Referring first to the example of FIG. 4C, suppose that for a "fruit" item category 405, the flexible shopping list 404 indicates that the picker should collect a total of three item types 415: six fresh and organic Fuji apples, five fresh and organic green bananas, and four fresh and organic navel oranges, which were ranked 320 first, second, and third, respectively, by the online system 140. In this example, suppose also that a notification is received 380 from a picker client device 110 associated with the picker indicating that the picker is unable to collect five fresh and organic green bananas. In the above example, the online system 140 may update 390 the flexible shopping list 404 to include or prioritize an additional item type 415 ranked 320 fourth by the online system 140 and information describing a quantity/budget 407 associated with the additional item type 415 to be collected by the picker, such as four fresh and organic yellow peaches, as shown in FIG. 4D. Continuing with this example, the updated flexible shopping list 404 may be sent 370 for display to the picker client device 110, and the process repeated for item types 415 associated with progressively lower ranks 403 until the picker indicates they have collected three item types 415 associated with the "fruit" item category 405.

Additional Considerations

The foregoing description of the embodiments has been presented for the purpose of illustration; a person of ordinary skill in the art would recognize that many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine learning models in the performance of their described functionalities. A "machine learning model," as used herein, comprises one or more machine learning models that perform the described functionality. Machine learning models may be stored on one or more computer-readable media with a set of weights. These weights are parameters used by the machine learning model to transform input data received by the model into output data. The weights may be generated through a training process, whereby the machine learning model is trained based on a set of training examples and labels associated with the training examples. The training process may include: applying the machine learning model to a training example, comparing an output of the machine learning model to the label associated with the training example, and updating weights associated with the machine learning model through a back-propagation process. The weights may be stored on one or more computer-readable media, and are used by a system when applying the machine learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or." For example, a condition "A or B" is satisfied by any one of the following: A is true (or present) and B is false (or not present), A is false (or not present) and B is true (or present), and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method comprising, at a computer system comprising a processor and a computer-readable medium:
generating, for a user of an online system, a template shopping list comprising a set of ranked item categories, wherein generating the template shopping list comprises:
accessing a machine learning model trained to predict a likelihood of conversion for an item category by the user, wherein the machine learning model is trained based at least in part on historical order information associated with the user,
applying the machine learning model to one or more attributes of the user and each item category of a plurality of item categories to predict the likelihood of conversion for each item category of the plurality of item categories by the user,
ranking, based at least in part on the likelihood of conversion predicted for each item category of the plurality of item categories, the plurality of item categories to generate a ranked list of item categories,
selecting, using the likelihood of conversion predicted for each item category of the plurality of item categories, the set of ranked item categories from the ranked list of item categories, and
populating the template shopping list with the set of ranked item categories;
for each item category of the set of ranked item categories from the template shopping list, applying the machine learning model to one or more additional attributes of the user and each item type of a set of item types associated with each item category to predict an additional likelihood of conversion for each item type of the set of item types by the user;
for each item category of the set of ranked item categories from the template shopping list, ranking the set of item types based at least in part on the additional likelihood of conversion for each item type of the set of item types to generate a ranked set of item types;
determining, based at least in part on the historical order information associated with the user, a set of collection rules associated with one or more of: an item category and an item type;
generating a suggested shopping list by populating each item category of the set of ranked item categories from the template shopping list with the set of ranked item types and information describing a quantity of each item type of the set of ranked item types based at least in part on the ranking and the set of collection rules; and
sending the suggested shopping list and the set of collection rules for display at a user interface of a device associated with the user, wherein
a first area of the user interface includes the set of ranked item categories, information describing a quantity of the set of ranked item types for each item category, and a collection rule of the set of collection rules associated with each item category, and
a second area of the user interface includes, for each item category of the set of ranked item categories, the set of ranked item types, information describing a quantity of each item type of the set of ranked item types, and a collection rule of the set of collection rules associated with each item type of the set of ranked item types.

2. The method of claim 1, wherein the set of collection rules describes one or more selected from the group consisting of: a quantity of item types associated with an item category to be collected in an order for the user, a quantity of an item type to be collected in an order for the user, a quality of item types associated with an item category to be collected in an order for the user, a quality of an item type to be collected in an order for the user, a budget for item types associated with an item category to be collected in an order for the user, and a budget associated with an item type to be collected in an order for the user.

3. The method of claim 1, further comprising:
storing the template shopping list and the set of collection rules in association with user-identifying information associated with the user.

4. The method of claim 1, further comprising:
receiving a request from the device associated with the user to modify one or more of: one or more item categories of the plurality of item categories, the set of item types, and the set of collection rules; and
modifying, based at least in part on the request from the device associated with the user, the one or more of: the one or more item categories, the set of item types, and the set of collection rules.

5. The method of claim 1, further comprising:
receiving a request from the device associated with the user to accept one or more of: the template shopping list, the suggested shopping list, and the set of collection rules.

6. The method of claim 1, further comprising:
responsive to receiving a request from the device associated with the user to accept the suggested shopping list and the set of collection rules, sending the suggested shopping list and the set of collection rules to a device associated with a picker servicing a new order for the user;
receiving a notification from the device associated with the picker that an item type included in the suggested shopping list does not satisfy one or more collection rules of the set of collection rules;
updating the suggested shopping list to include an additional item type and information describing a quantity of the additional item type based at least in part on the ranking of the set of item types and the set of collection rules; and
sending the updated suggested shopping list for display at a user interface of the picker device associated with the picker.

7. The method of claim 1, wherein the historical order information associated with the user comprises: a time at which the user placed a previous order, a total number of items included in a previous order placed by the user, a total amount spent by the user on a previous order, a name of an item type previously ordered by the user, an item category associated with an item type previously ordered by the user, a quantity of an item type previously ordered by the user, a price associated with an item type previously ordered by the user, a sale associated with an item type previously ordered by the user, a discount associated with an item type previously ordered by the user, a stock keeping unit (SKU) associated with an item type previously ordered by the user, a serial number associated with an item type previously ordered by the user, a model associated with an item type previously ordered by the user, a size of an item type previously ordered by the user, a dimension of an item type previously ordered by the user, a color of an item type previously ordered by the user, a quality of an item type previously ordered by the user, a brand associated with an item type previously ordered by the user, a seasonality associated with an item type previously ordered by the user, a freshness of an item type previously ordered by the user, one or more ingredients included in an item type previously ordered by the user, one or more materials included in an item type previously ordered by the user, a manufacturing location associated with an item type previously ordered by the user, feedback associated with a previous order placed by the user, a refund for a previous order placed by the user, and an instruction associated with a previous order placed by the user.

8. The method of claim 1, wherein the one or more attributes of the user and each item category of the plurality of item categories comprise one or more selected from the group consisting of: a tenure of the user with the online system, a platform used by the user to access the online system, a geographical region associated with the user, an average amount the user spends on each order, an average number of orders placed by the user for a period of time, a frequency with which the user places orders, a set of dietary preferences associated with the user, a discount affinity of the user, a price sensitivity of the user, an average number of an item type ordered by the user, a frequency with which the user orders an item type, a search history of the user, a browsing history of the user, a retailer with which the user interacted, and an item type with which the user interacted.

9. The method of claim 1, wherein the machine learning model is further trained based at least in part on data for a retailer with which the user interacted, wherein the data for the retailer with which the user interacted comprises one or more selected from the group consisting of: a name of the retailer, a type associated with the retailer, and a geographical location associated with the retailer.

10. A computer program product comprising a non-transitory computer-readable storage medium having instructions encoded thereon that, when executed by a processor, cause the processor to perform actions comprising:
generating, for a user of an online system, a template shopping list comprising a set of ranked item categories, wherein generating the template shopping list comprises:
accessing a machine learning model trained to predict a likelihood of conversion for an item category by the user, wherein the machine learning model is trained based at least in part on historical order information associated with the user,
applying the machine learning model to one or more attributes of the user and each item category of a plurality of item categories to predict the likelihood of conversion for each item category of the plurality of item categories by the user,
ranking, based at least in part on the likelihood of conversion predicted for each item category of the plurality of item categories, the plurality of item categories to generate a ranked list of item categories,
selecting, using the likelihood of conversion predicted for each item category of the plurality of item categories, the set of ranked item categories from the ranked list of item categories, and
populating the template shopping list with the set of ranked item categories;
for each item category of the set of ranked item categories from the template shopping list, applying the machine learning model to one or more additional attributes of the user and each item type of a set of item types associated with each item category to predict an additional likelihood of conversion for each item type of the set of item types by the user;
for each item category of the set of ranked item categories from the template shopping list, ranking the set of item types based at least in part on the additional likelihood of conversion for each item type of the set of item types to generate a ranked set of item types;

determining, based at least in part on the historical order information associated with the user, a set of collection rules associated with one or more of: an item category and an item type;

generating a suggested shopping list by populating each item category of the set of ranked item categories from the template shopping list with the set of ranked item types and information describing a quantity of each item type of the set of ranked item types based at least in part on the ranking and the set of collection rules; and sending the suggested shopping list and the set of collection rules for display at a user interface of a device associated with the user, wherein a first area of the user interface includes the set of ranked item categories, information describing a quantity of the set of ranked item types for each item category, and a collection rule of the set of collection rules associated with each item category, and a second area of the user interface includes, for each item category of the set of ranked item categories, the set of ranked item types, information describing a quantity of each item type of the set of ranked item types, and a collection rule of the set of collection rules associated with each item type of the set of ranked item types.

11. The computer program product of claim 10, wherein the set of collection rules describes one or more selected from the group consisting of: a quantity of item types associated with an item category to be collected in an order for the user, a quantity of an item type to be collected in an order for the user, a quality of item types associated with an item category to be collected in an order for the user, a quality of an item type to be collected in an order for the user, a budget for item types associated with an item category to be collected in an order for the user, and a budget associated with an item type to be collected in an order for the user.

12. The computer program product of claim 10, wherein the computer-readable storage medium further has instructions encoded thereon that, when executed by the processor, cause the processor to perform actions comprising:
storing the template shopping list and the set of collection rules in association with user-identifying information associated with the user.

13. The computer program product of claim 10, wherein the computer-readable storage medium further has instructions encoded thereon that, when executed by the processor, cause the processor to perform actions comprising:
receiving a request from the device associated with the user to modify one or more of: one or more item categories of the plurality of item categories, the set of item types, and the set of collection rules; and
modifying, based at least in part on the request from the device associated with the user, the one or more of: the one or more item categories, the set of item types, and the set of collection rules.

14. The computer program product of claim 10, wherein the computer-readable storage medium further has instructions encoded thereon that, when executed by the processor, cause the processor to perform actions comprising:
receiving a request from the device associated with the user to accept one or more of: the template shopping list, the suggested shopping list, and the set of collection rules.

15. The computer program product of claim 10, wherein the computer-readable storage medium further has instructions encoded thereon that, when executed by the processor, cause the processor to perform actions comprising:
responsive to receiving a request from the device associated with the user to accept the suggested shopping list and the set of collection rules, sending the suggested shopping list and the set of collection rules to a device associated with a picker servicing a new order for the user;
receiving a notification from the device associated with the picker that an item type included in the suggested shopping list does not satisfy one or more collection rules of the set of collection rules;
updating the suggested shopping list to include an additional item type and information describing a quantity of the additional item type based at least in part on the ranking of the set of item types and the set of collection rules; and
sending the updated suggested shopping list for display at a user interface of the picker device associated with the picker.

16. The computer program product of claim 10, wherein the historical order information associated with the user comprises: a time at which the user placed a previous order, a total number of items included in a previous order placed by the user, a total amount spent by the user on a previous order, a name of an item type previously ordered by the user, an item category associated with an item type previously ordered by the user, a quantity of an item type previously ordered by the user, a price associated with an item type previously ordered by the user, a sale associated with an item type previously ordered by the user, a discount associated with an item type previously ordered by the user, a stock keeping unit (SKU) associated with an item type previously ordered by the user, a serial number associated with an item type previously ordered by the user, a model associated with an item type previously ordered by the user, a size of an item type previously ordered by the user, a dimension of an item type previously ordered by the user, a color of an item type previously ordered by the user, a quality of an item type previously ordered by the user, a brand associated with an item type previously ordered by the user, a seasonality associated with an item type previously ordered by the user, a freshness of an item type previously ordered by the user, one or more ingredients included in an item type previously ordered by the user, one or more materials included in an item type previously ordered by the user, a manufacturing location associated with an item type previously ordered by the user, feedback associated with a previous order placed by the user, a refund for a previous order placed by the user, and an instruction associated with a previous order placed by the user.

17. The computer program product of claim 10, wherein the one or more attributes of the user and each item category of the plurality of item categories comprise one or more selected from the group consisting of: a tenure of the user with the online system, a platform used by the user to access the online system, a geographical region associated with the user, an average amount the user spends on each order, an average number of orders placed by the user for a period of time, a frequency with which the user places orders, a set of dietary preferences associated with the user, a discount affinity of the user, a price sensitivity of the user, an average number of an item type ordered by the user, a frequency with which the user orders an item type, a search history of the user, a browsing history of the user, a retailer with which the user interacted, and an item type with which the user interacted.

18. A computer system comprising:

a processor; and a non-transitory computer readable storage medium storing instructions that, when executed by the processor, perform actions comprising:

generating, for a user of an online system, a template shopping list comprising a set of ranked item categories, wherein generating the template shopping list comprises:

accessing a machine learning model trained to predict a likelihood of conversion for an item category by the user, wherein the machine learning model is trained based at least in part on historical order information associated with the user, applying the machine learning model to one or more attributes of the user and each item category of a plurality of item categories to predict the likelihood of conversion for each item category of the plurality of item categories by the user, ranking, based at least in part on the likelihood of conversion predicted for each item category of the plurality of item categories, the plurality of item categories to generate a ranked list of item categories, selecting, using the likelihood of conversion predicted for each item category of the plurality of item categories, the set of ranked item categories from the ranked list of item categories, and populating the template shopping list with the set of ranked item categories;

for each item category of the set of ranked item categories from the template shopping list, applying the machine learning model to one or more additional attributes of the user and each item type of a set of item types associated with each item category to predict an additional likelihood of conversion for each item type of the set of item types by the user;

for each item category of the set of ranked item categories from the template shopping list, ranking the set of item types based at least in part on the additional likelihood of conversion for each item type of the set of item types to generate a ranked set of item types;

determining, based at least in part on the historical order information associated with the user, a set of collection rules associated with one or more of: an item category and an item type;

generating a suggested shopping list by populating each item category of the set of ranked item categories from the template shopping list with the set of ranked item types and information describing a quantity of each item type of the set of ranked item types based at least in part on the ranking and the set of collection rules; and sending the suggested shopping list and the set of collection rules for display at a user interface of a device associated with the user, wherein a first area of the user interface includes the set of ranked item categories, information describing a quantity of the set of ranked item types for each item category, and a collection rule of the set of collection rules associated with each item category, and a second area of the user interface includes, for each item category of the set of ranked item categories, the set of ranked item types, information describing a quantity of each item type of the set of ranked item types, and a collection rule of the set of collection rules associated with each item type of the set of ranked item types.

* * * * *